March 16, 1954   B. L. HAVENS   2,672,283
ELECTRONIC MULTIPLIER
Filed Sept. 3, 1948   14 Sheets-Sheet 1

INVENTOR
Byron L. Havens
BY
ATTORNEY

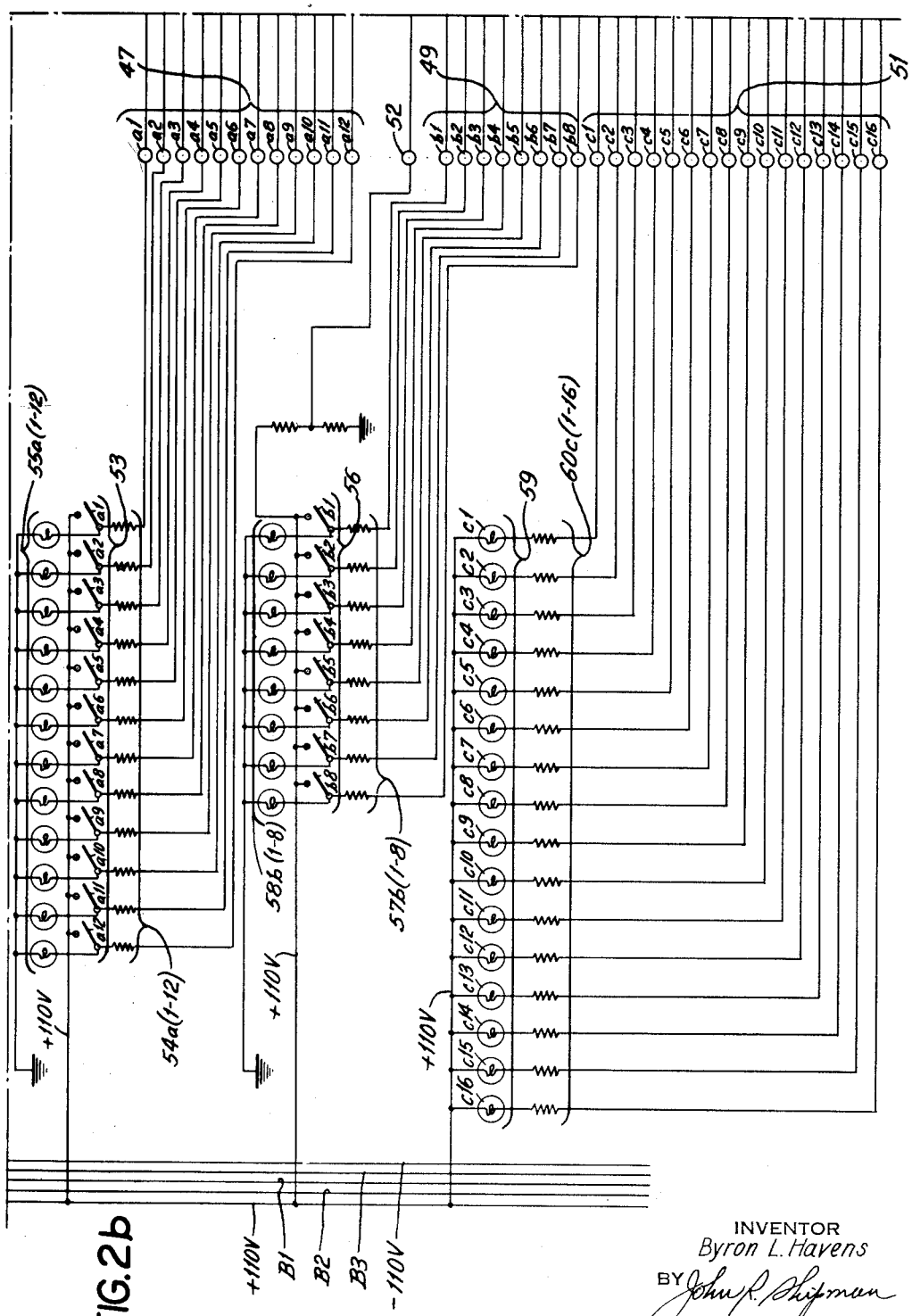

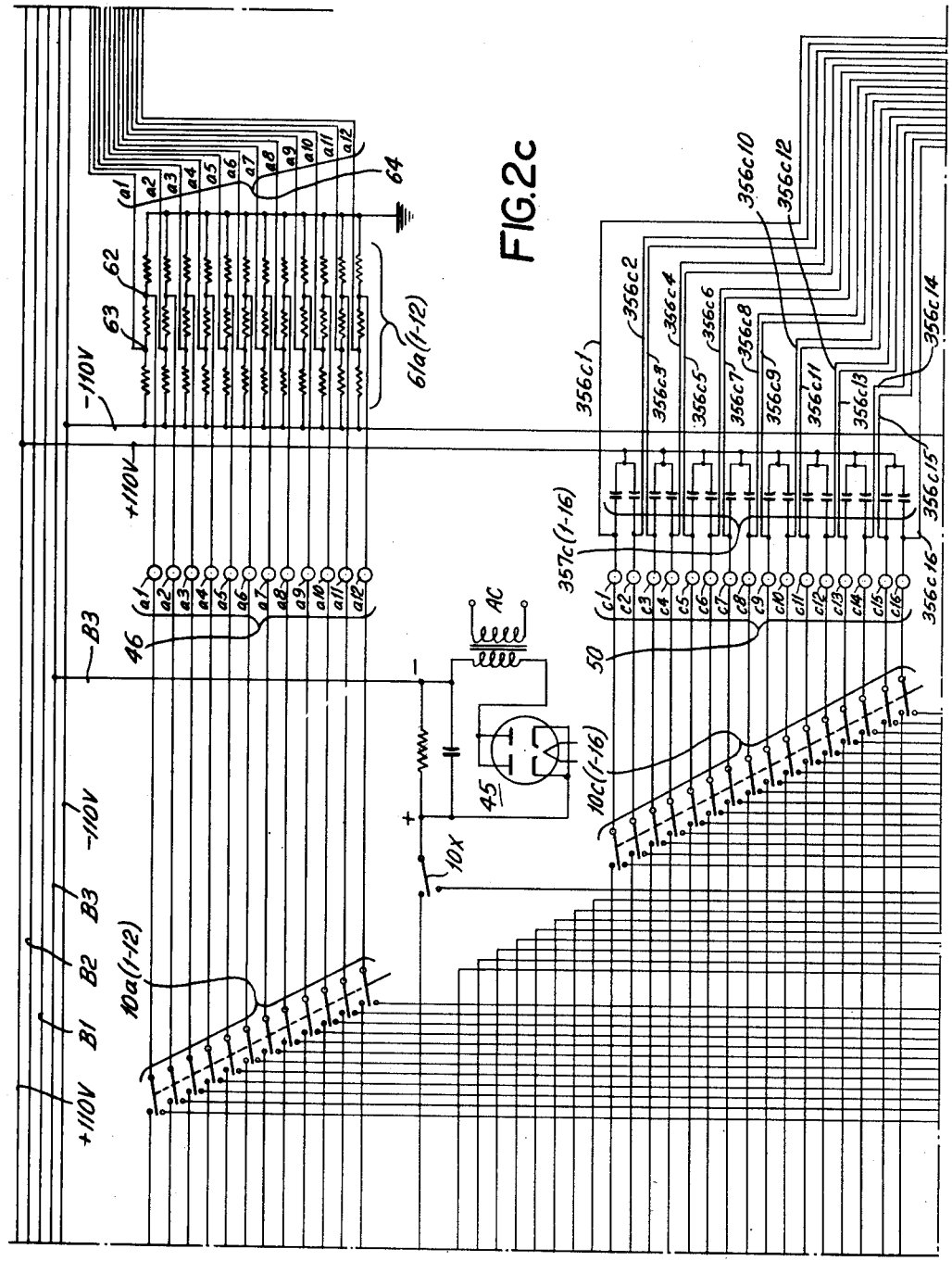

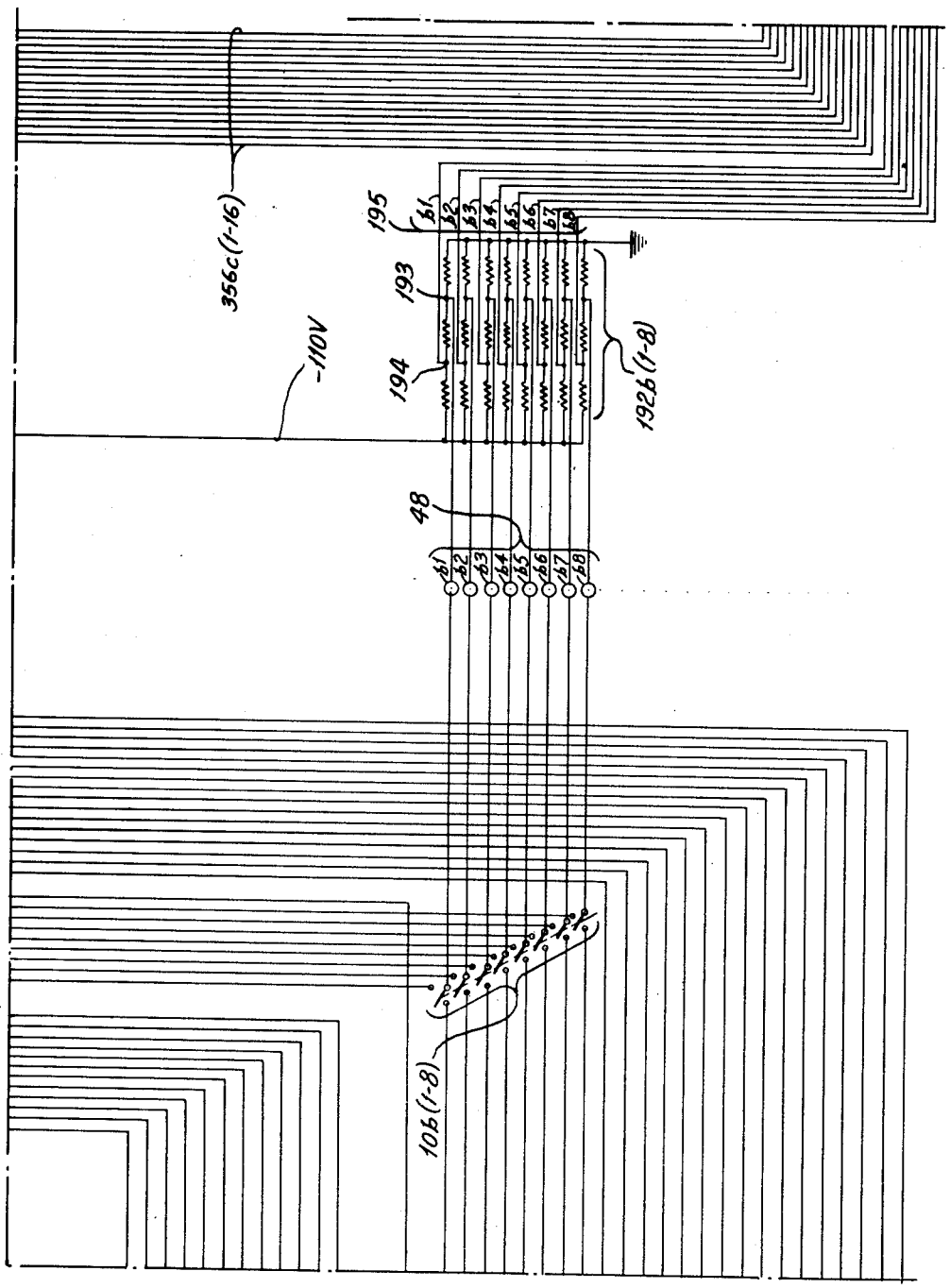

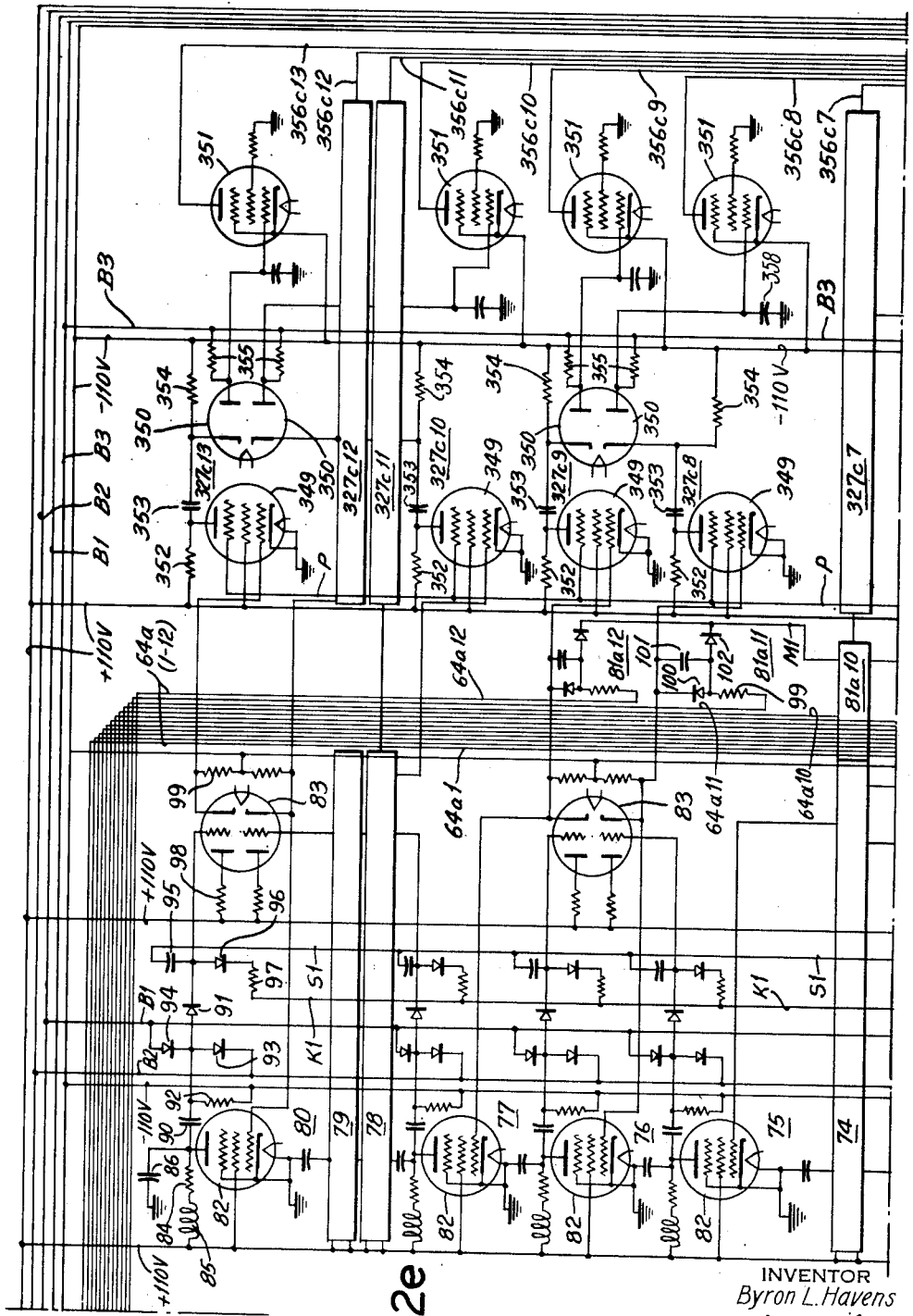

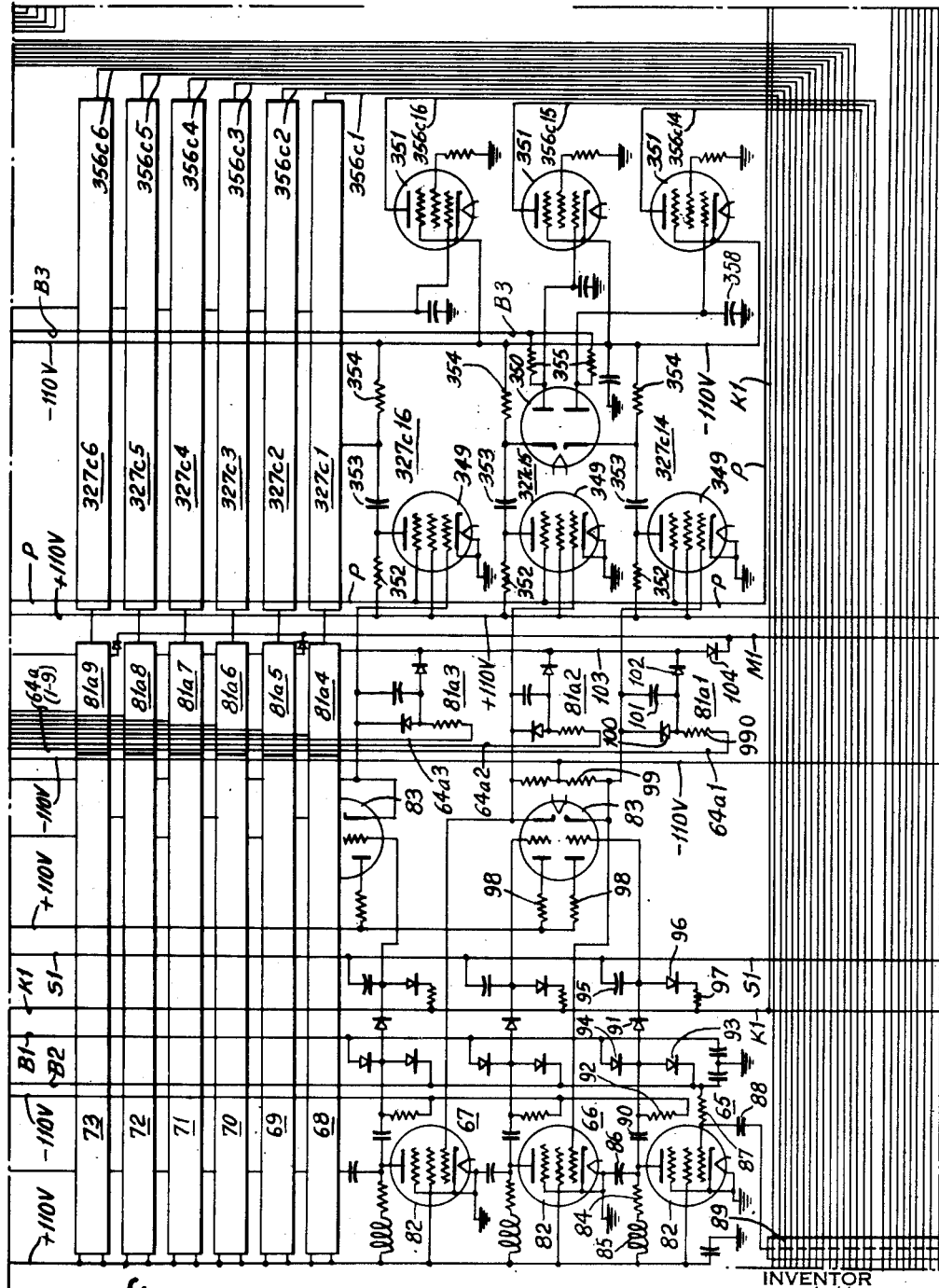

March 16, 1954

B. L. HAVENS 2,672,283

ELECTRONIC MULTIPLIER

Filed Sept. 3, 1948

INVENTOR
*Byron L. Havens*
BY
*John P. Shipman*
ATTORNEY

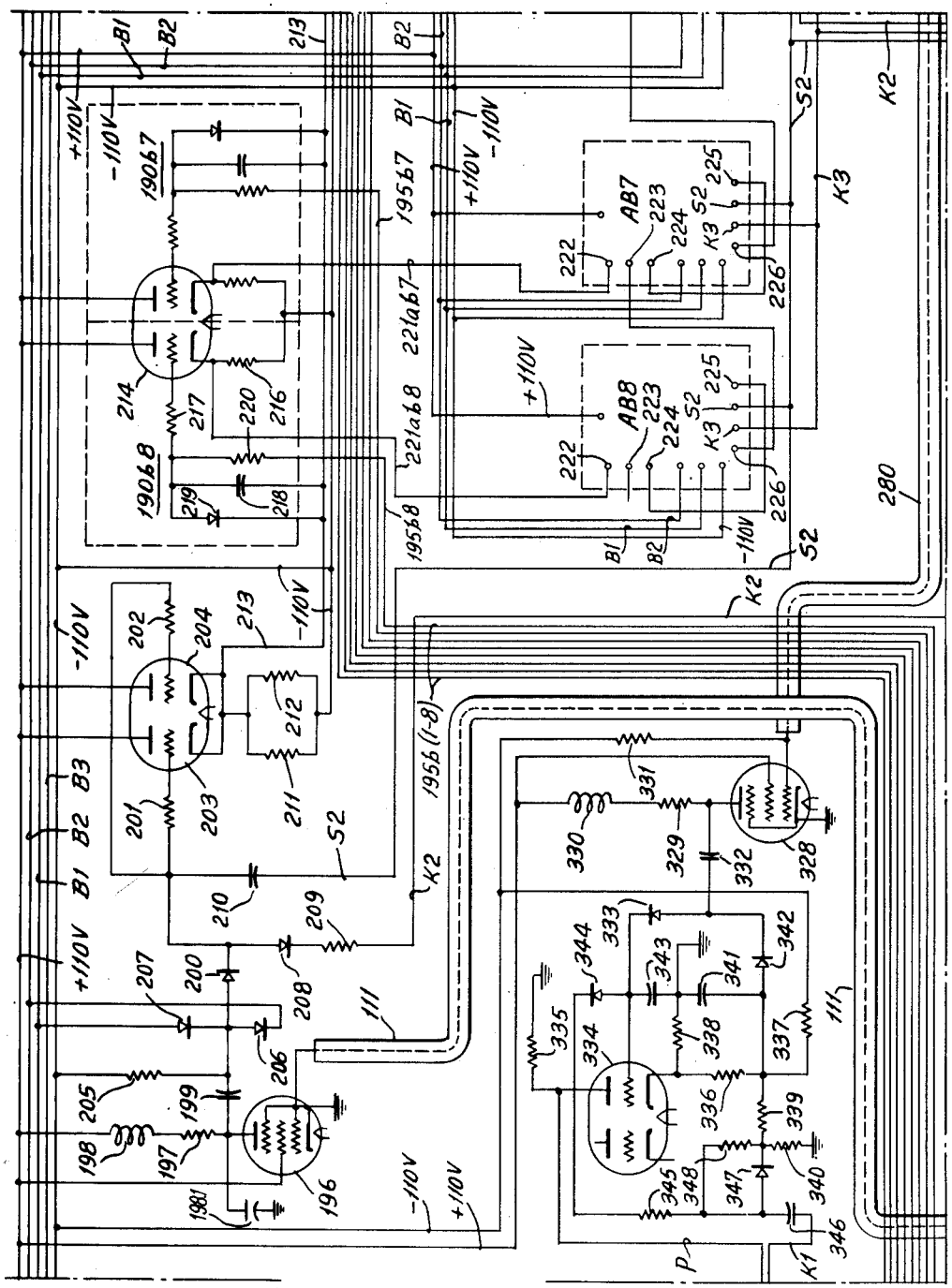

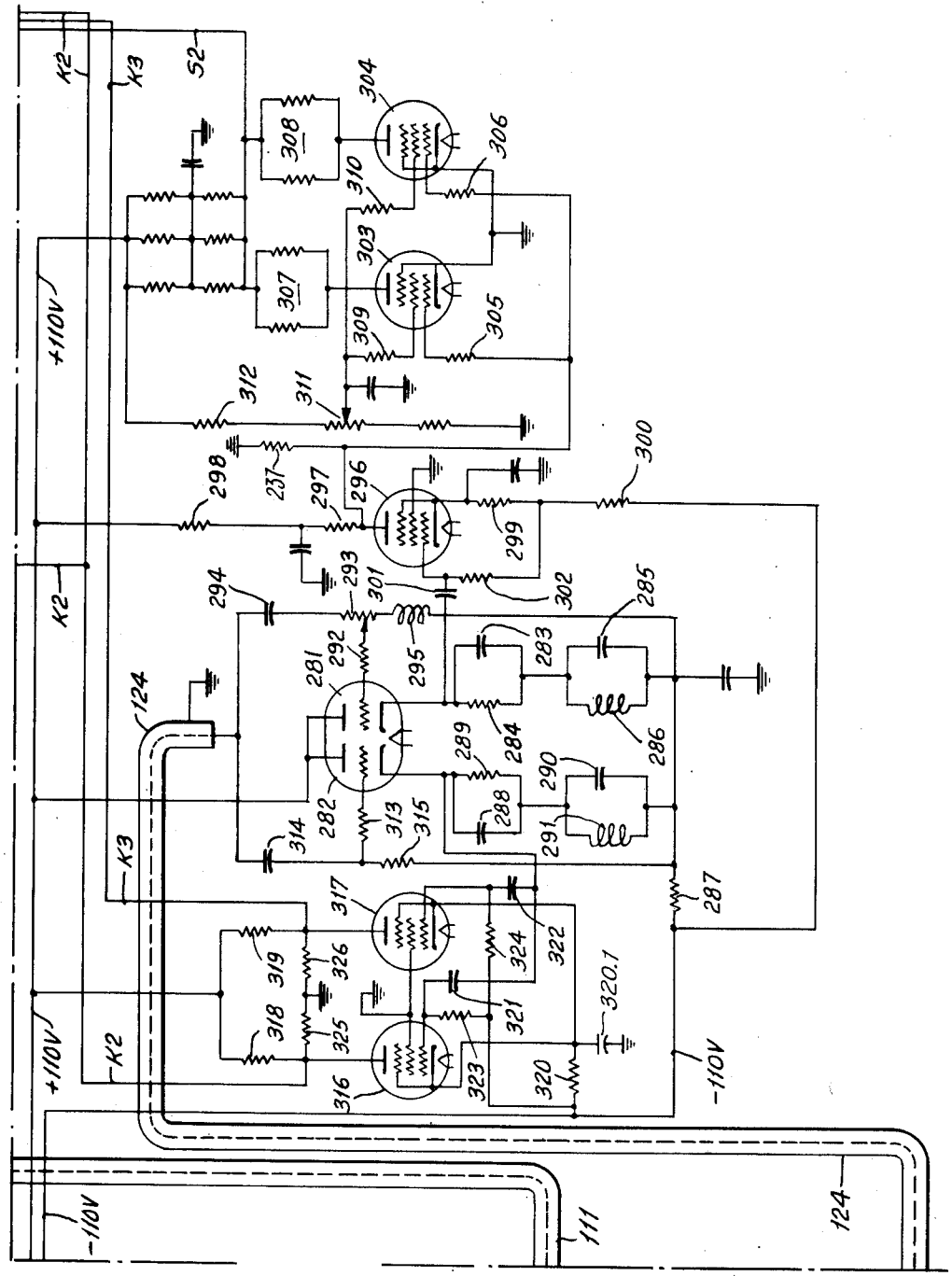

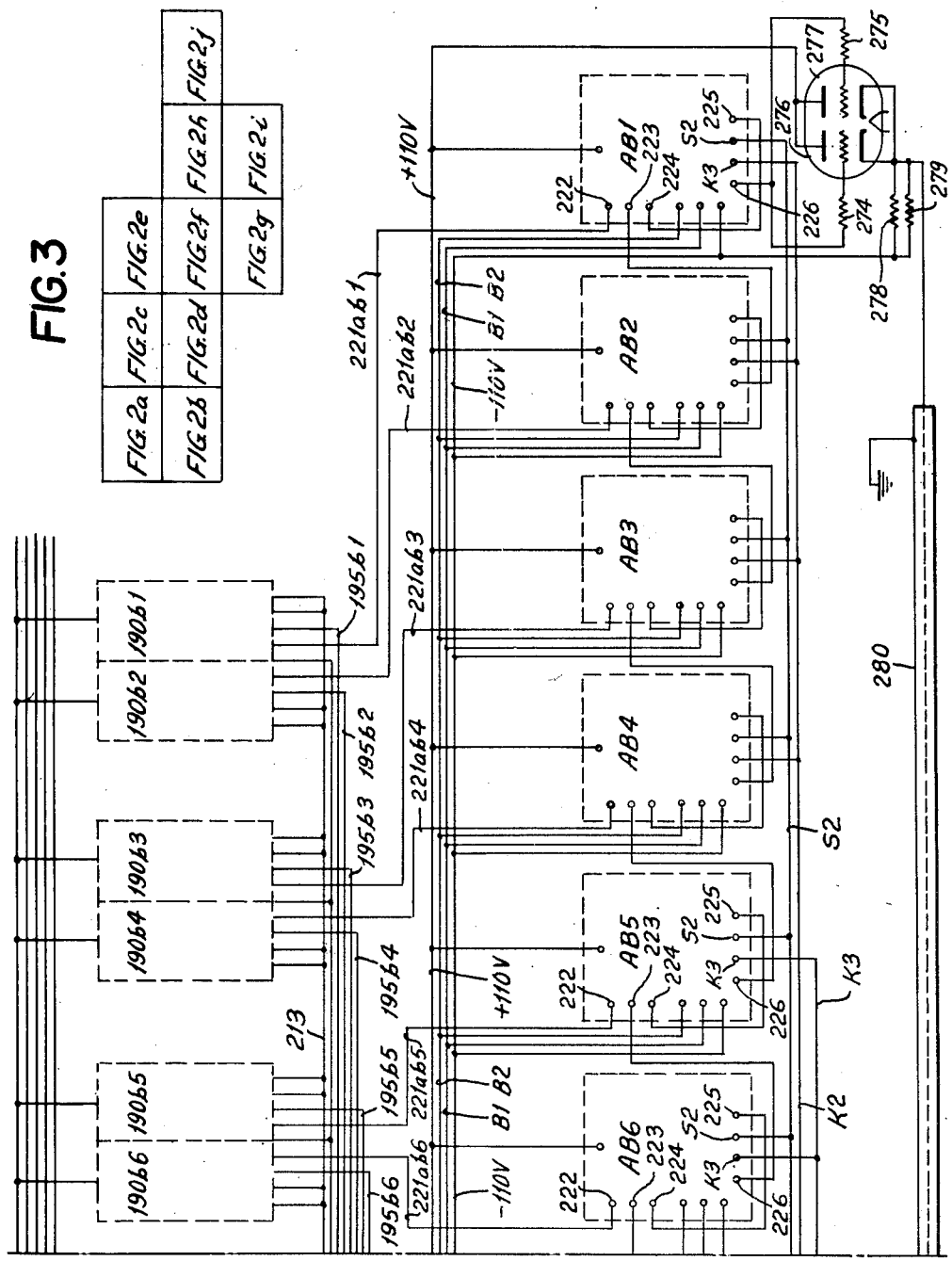

March 16, 1954  B. L. HAVENS  2,672,283
ELECTRONIC MULTIPLIER
Filed Sept. 3, 1948  14 Sheets-Sheet 12

INVENTOR
Byron L. Havens
BY
ATTORNEY

March 16, 1954  B. L. HAVENS  2,672,283
ELECTRONIC MULTIPLIER
Filed Sept. 3, 1948  14 Sheets-Sheet 13

INVENTOR
Byron L. Havens
BY
ATTORNEY

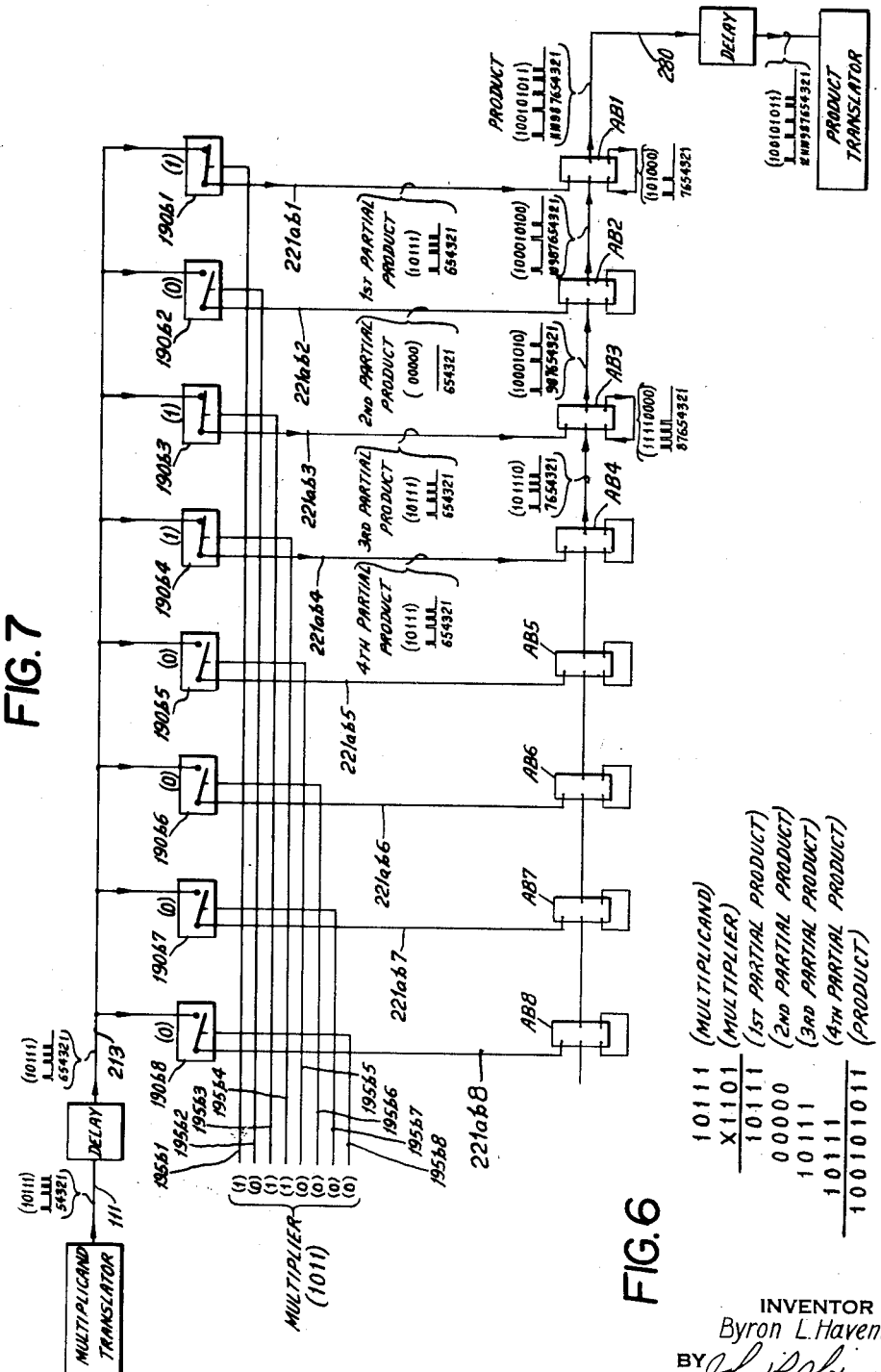

Patented Mar. 16, 1954

2,672,283

UNITED STATES PATENT OFFICE 2,672,283

ELECTRONIC MULTIPLIER

Byron L. Havens, Cresskill, N. J., assignor to International Business Machines Corporation, New York, N. Y., a corporation of New York Application September 3, 1948, Serial No. 47,626

20 Claims. (Cl. 235—61)

This invention relates to a computing device and more particularly to a device for computing the product of two quantities.

It is an object of my invention to provide a new and improved device for multiplying two quantities together.

Another object is to provide a novel electronic device for multiplying two quantities manifested or recorded in the binary system of numerical notation. In the binary system, as is well known, the digital positions in a binary number beginning at the right end digital position and proceeding to the left, correspond in value to the successive increasing powers of 2, that is, $2^0$, $2^1$, $2^2$, $2^3$, etc. Only two kinds of digits are employed in writing a number in the binary system, namely, a binary 0 and a binary 1. A binary 0 represents zero value at any digital position in the number and a binary 1 represents the power of 2 corresponding to the digital position in which the binary 1 is located. The value of a complete binary number is the sum of the values represented by all of the binary digits. Thus, a number may be manifested in the binary system by a binary 1 at the digital position corresponding in value to, or at the plurality of digital positions having corresponding values the sum of which equals to, the amount to be manifested with a binary 0 at all other digital positions. Frequently, in manifesting or recording a quantity in the binary system on a record wherein the digital positions are clearly defined, a binary 1 is indicated by a mark or a perforation at the appropriate digital position while a binary 0 is indicated by the absence of such a mark or perforation, as the case may be.

A further object of my invention is to provide a novel multiplying device in which two quantities recorded on a record sheet are multiplied and the product is recorded.

Still another object is to provide a new and improved multiplying device in which two quantities, either or both of which is recorded on a record sheet or is manually selected, are multiplied by an electronic circuit device and the product is either recorded or visually indicated.

An ancillary object of my invention is to provide a novel electronic commutator.

Another object is to provide a new circuit arrangement effective to translate a binary number represented as one or more selectively energized circuits, into a series of time coded voltage impulses.

A still further object is to provide a novel electronic circuit arrangement for translating a series of time coded voltage impulses representing a binary number into a representation by one or more selectively energized circuits.

Another ancillary object is to provide a novel electronic circuit for adding two binary numbers supplied thereto in time coded impulse form.

Another object is to provide a novel switching circuit arrangement operable only in response to the simultaneous occurrence of voltage impulses at three or more different points.

Another object is to provide a new and simplified pulse inverting circuit.

A further object is to provide a novel synchronous delay circuit for voltage impulses.

The adding circuits and the related coincidence circuits disclosed herein are disclosed and claimed in copending divisional application Serial No. 263,731 filed December 21, 1951. The commutator and pulse delay circuits disclosed in the present application are disclosed and claimed in copending divisional application Serial No. 262,732 filed December 21, 1951.

In accordance with my invention, one of the two quantities to be multiplied, that is the multiplicand, is translated into time coded, voltage impulse form and supplied simultaneously to a plurality of coincidence circuits corresponding to the different digital positions in the multiplier, each coincidence circuit being responsive to the digit in the multiplier in the corresponding digital position. Then, through the action of the coincidence circuits, all of the digits of the multiplicand are multiplied by each digit of the multiplier individually with each resulting partial product appearing in coded impulse form in the output of the corresponding coincidence circuit, each digit of the multiplicand being simultaneously and individually multiplied by every digit of the multiplier. The partial products thus obtained are then applied to a series chain of adding circuits, known as adding boxes, at different points on the chain corresponding to the proper columnar position of the partial products for adding. The resulting sum represents the product of the multiplicand and the multiplier in time coded impulse form which may be translated into another form for recording purposes.

Other objects and novel features of the invention are pointed out in the following description and claims and illustrated in the accompanying drawings, which disclose, by way of example, the principle of the invention and the best mode, which has been contemplated, of applying that principle.

In the drawings:

Fig. 1 is a block diagram showing the general relationships between the different components of a multiplying device embodying my invention.

Figs. 2(a–j) together comprise a circuit diagram of the multiplying device represented generally in Fig. 1.

Fig. 3 is a diagram illustrating the position relationships of Figs. 2(a–j) in forming the complete circuit diagram.

Fig. 6 illustrates the usual manner of performing the multiplication operation for a sample problem.

Fig. 7 is a diagram illustrating the multiplication operation in the multiplying device for the same sample problem.

*General arrangement of multiplying device*

Figure 1:
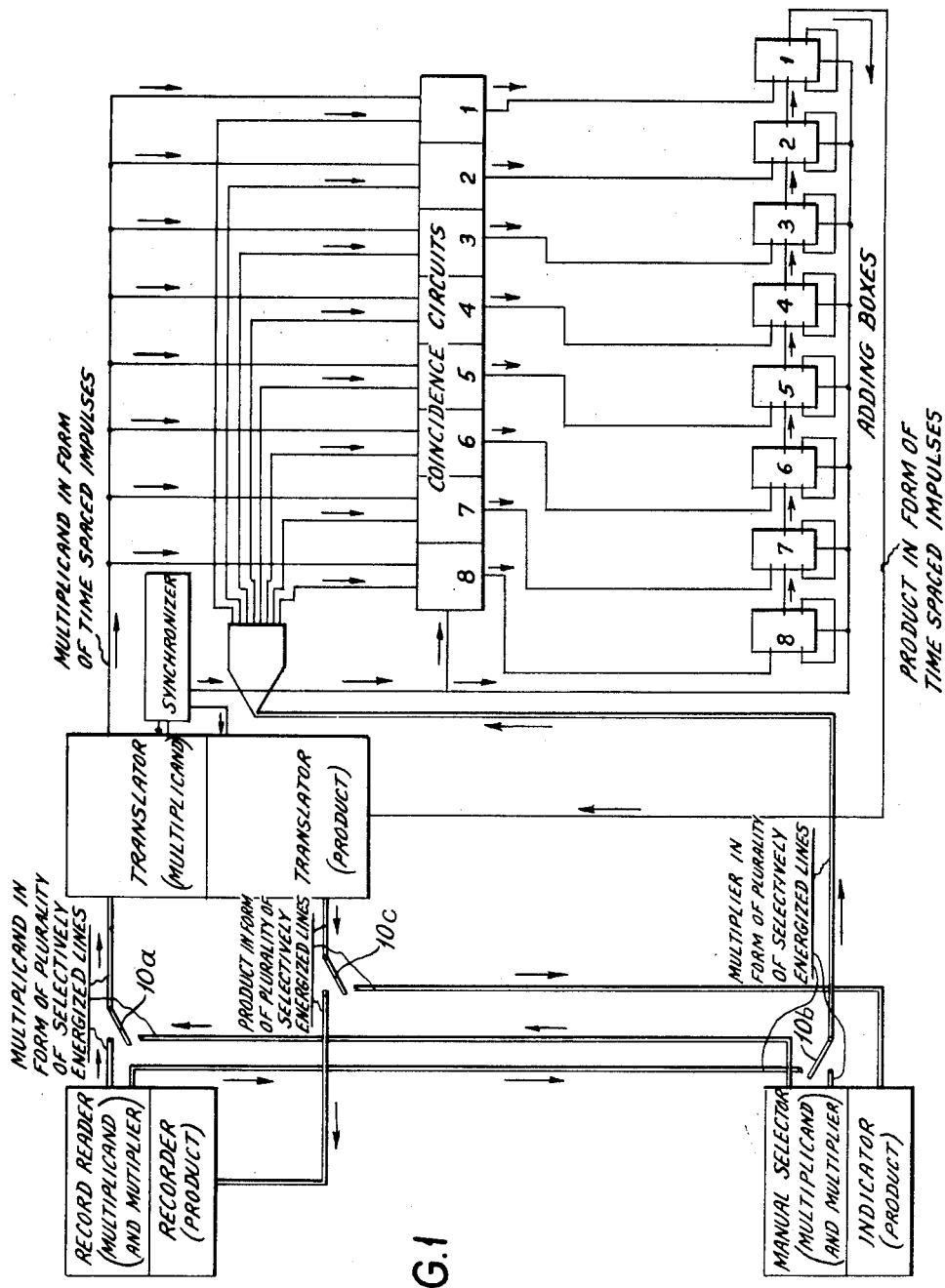

In the multiplying device as shown in Fig. 1, groups of switches 10a and 10b are arranged to permit alternate use of a record reader or a manual selector to introduce the problem and another group of switches 10c to permit alternate use of a product recorder or a visual product indicator as desired.

If the record reader and recorder are employed, the record reader reads the problem (i. e., reads the multiplicand and multiplier from a record, such as the familiar perforated record card) and closes, or causes energization of, certain of a plurality of circuits selectively in each of two groups of circuits to represent the multiplicand and multiplier, respectively. After the multiplication operation is completed, certain circuits extending through the recorder are energized selectively to represent the product and to cause that product to be recorded, as by perforating a record card.

In the event it is desired to set up the problem or any part of it manually rather than automatically from a record and/or to view the product by visual indicating means rather than to record it, the manual selector for the multiplicand and multiplier and the visual product indicator are used. The manual selector permits the selective closing or energization of circuits manually to represent the multiplicand and the multiplier and includes visual indicators to show the number selected for both the multiplicand and the multiplier. The product indicator is arranged so that upon the completion of certain circuits selectively to represent the product after the multiplication has been performed, a visual indication of that product is provided as by the selective illumination of a group of lights.

The circuits selectively energized by either the record reader or the manual selector, as the case may be, and representing the multiplicand, are coupled to a multiplicand translator. This translator is effective to translate the selectively energized circuits into time coded voltage impulses. A synchronizer is associated with the multiplicand translator to provide a periodic starting voltage impulse and other impulses for synchronization purposes.

In the time code employed in the device illustrated, a particular period of time is assigned to each digital position in the binary number to be represented. The time base necessary in setting up the code is established by the starting impulse from the synchronizer which, in the particular device illustrated, is repeated at periodic intervals. The time immediately following a starting impulse includes a plurality of time periods of equal length, each time period corresponding to a digital position in the binary number. The first time period following a starting impulse corresponds to the first digital position from the right end of the binary number; the second time period corresponds to the second digital position from the right end of the number; and so on through all of the time periods. If a voltage impulse occurs in any time period it represents a binary 1 at the corresponding digital position in the binary number. A binary 0 at any digital position is represented by the absence of a voltage impulse in the corresponding time period.

In the particular device illustrated time periods of one microsecond each are employed and the device is designed to handle a product having a maximum of sixteen binary digits. Consequently, to obtain the maximum speed of operation, the starting impulse is repeated once every sixteen microseconds. In obtaining the sixteen digit product, the device is designed to handle a multiplicand having up to twelve binary digits and a multiplier having up to eight binary digits. Apparatus of a different capacity may, of course, be used if desired.

As indicated, the output of the multiplicand translator is a series of coded, time spaced voltage impulses representing the multiplicand. This multiplicand in the coded impulse form is applied simultaneously to a plurality of coincidence circuits corresponding in number to the maximum multiplier digital positions which the device is designed to handle. Thus, there are eight coincidence circuits. Each coincidence circuit corresponds to a different digital position in the multiplier and is connected to the corresponding one of the selectively energized circuits representing the multiplier as provided by either the record reader or the manual selector. The arrangement is such that if a binary 1 is present at any digital position in the multiplier, the corresponding coincidence circuit passes on the coded impulses representing the multiplicand. On the other hand, those coincidence circuits corresponding to digital positions in the multiplier in which a binary 0 is present, do not pass on the coded impulses representing the multiplicand. As a result, the coded impulses representing the multiplicand appear at the outputs of only those coincidence circuits for which there is a binary 1 in the multiplier. The output of each coincidence circuit thus represents the partial product of the corresponding digit of the multiplier and all of the digits of the multiplicand.

To add the partial products supplied from the outputs of the coincidence circuits, a series chain of adding boxes is provided. Each adding box is arranged to accept simultaneously any two binary numbers in coded impulse form and compute and deliver the sum of these two numbers in the same coded impulse form but delayed by exactly one time period. The synchronizer is also associated with the adding boxes to insure an accurate time delay.

The outputs of the coincidence circuits are connected to the series chain of adding boxes with an adding box interposed between the outputs of successive coincidence circuits. The single time period delay provided by an adding box is thereby employed to provide in effect a column shift between successive partial products in the addition thereof. Thus, the partial product of one digit of the multiplier and all of the digits of the multiplicand, is added to the partial product of the next digit in the multiplier and all of the digits in the multiplicand, with an appropriate column shift therebetween. The sum of all of the partial products is obtained from the output of the chain of adding boxes and is supplied to the product translator in the form of time coded impulses delayed one time period with respect to the input to the chain of adding boxes. The product translator changes the product from the coded impulse form to the form of a plurality of selectively energized circuits. These selectively energized circuits are then effective to cause the product to be recorded or to give a visual indication of the product depending upon whether the translator is associated with the recorder or with the indicator.

*Record reader and recorder*

When the problem is to be taken from a record, such as a perforated record card, and the product is to be recorded, the switches 10a, 10b and 10c in Fig. 1 are set in their upper positions. A record reading and recording machine, such as is shown diagrammatically in Fig. 2a and in more detail in Fig. 4 and which is more fully shown and described in the patent to C. D. Lake, Re. 21,133, June 27, 1939, may be employed. The purpose of the record reader is to read the multiplicand and the multiplier from a record and selectively energize a plurality of circuits in each of two groups in accordance therewith. The recorder is responsive to a group of selectively energized circuits representing the product to record that product on a record sheet or card.

As previously indicated, the multiplicand and the multiplier may be manifested on a record card in the binary system by a plurality of perforations spaced along a row of digital positions on the card with a perforation representing a binary 1 and the absence of a perforation representing a binary 0 at any digital position. Preferably, the multiplicand is punched in one field of the card and the multiplier in another field but with the digital positions of both the multiplicand and the multiplier in a single row. Thus, a number of problems may be represented on a single card with each row of digital positions containing a separate problem.

Figure 4:
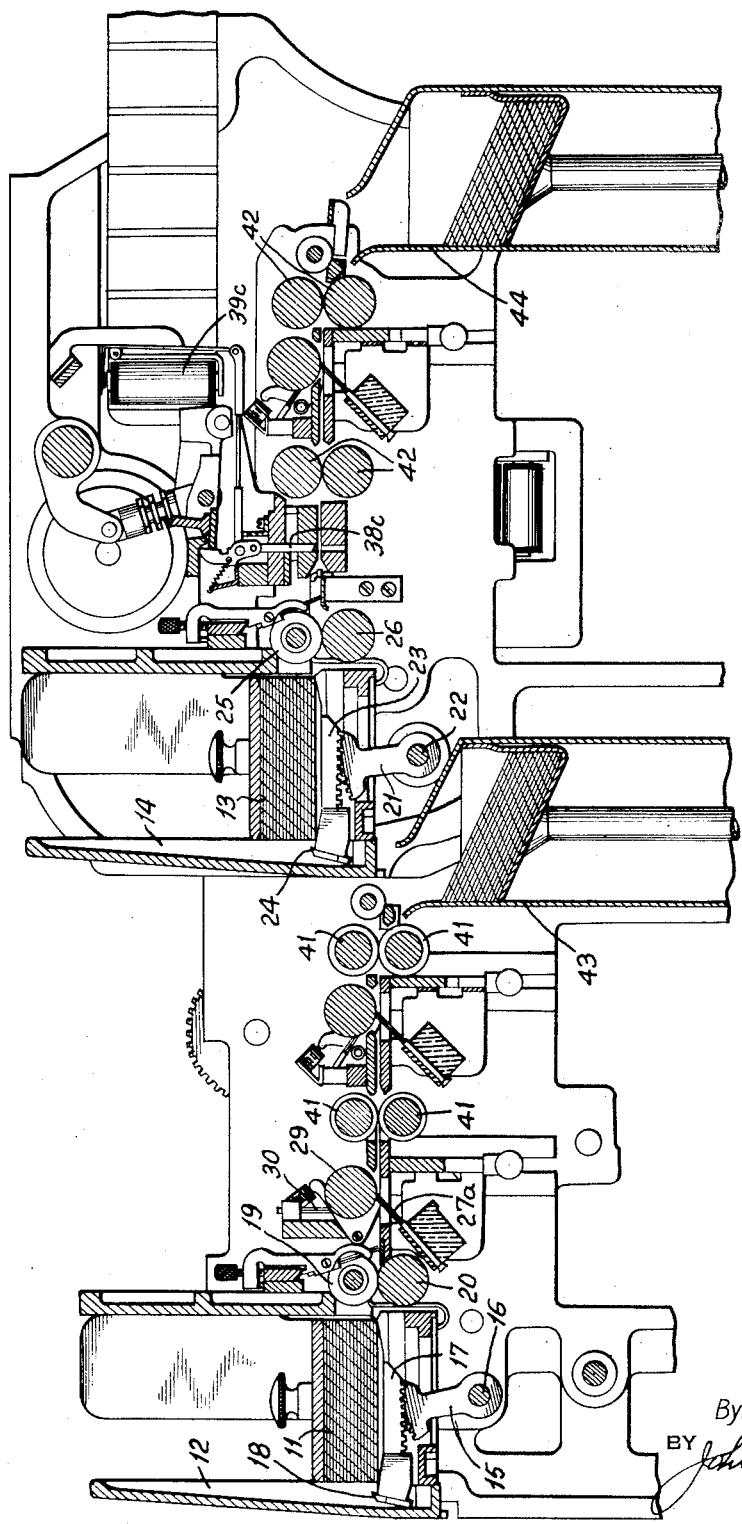
Fig. 4 is a sectional elevation view of a record reading and punching machine suitable for use in the multiplying device.

In Fig. 4, a plurality of punched record cards 11 containing the problems to be multiplied may be placed in a hopper 12 at the left of the machine while a plurality of blank product cards 13 on which the product is to be punched are located in a hopper 14 at the center of the machine. With the machine conditioned for operation, a problem card 11 and a product card 13 are fed in synchronism from the two hoppers 12 and 14. A pair of gear sectors 15, only one of which is shown, are carried by a shaft 16, rotary movement of which moves the sectors to move in turn a corresponding card feed picker slide 17 at the bottom of the problem card hopper 12 to cause the picker knife 18 carried by the corresponding slide 17 to feed a card 11 from the bottom of the hopper 12 to a pair of feeding rollers 19 and 20. Similarly, another pair of gear sectors 21, only one of which is shown, are carried by a shaft 22, rotary movement of which moves the sectors 21 to move in turn a corresponding card feed picker slide 23 at the bottom of the product card hopper 14 to cause the picker knife 24 carried by that slide 23 to feed a product card 13 to another pair of feeding rollers 25 and 26. The product and the problem cards so fed are moved along concurrently and in synchronism to convey the problem card 11 to a sensing station and the product card 13 to a punching station.

Figure 2A:
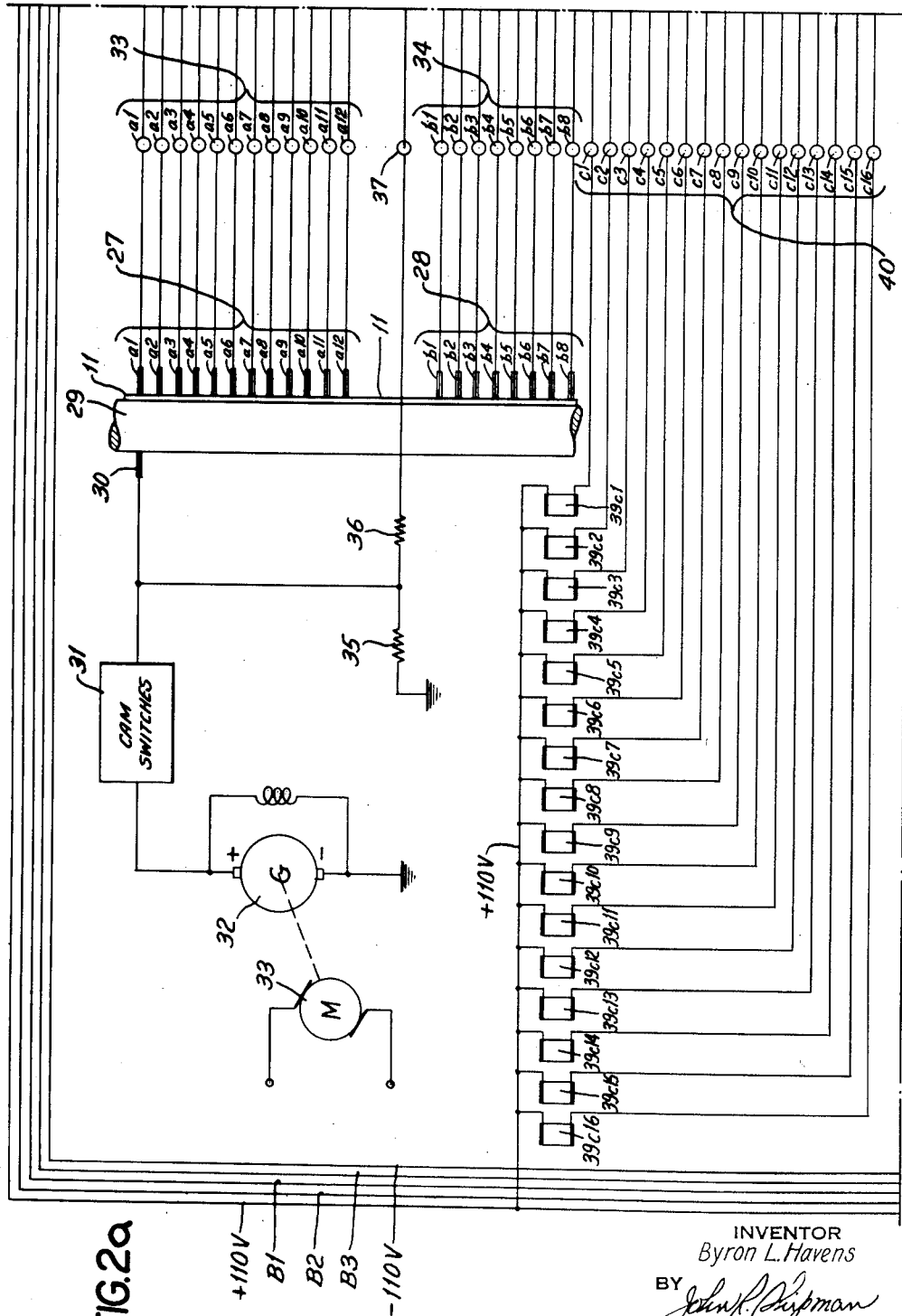

As shown in Figs. 2a and 4, the sensing station comprises a first plurality of sensing brushes $27a(1-12)$, a second plurality of sensing brushes $28b(1-8)$, a contact roller 29 having a conductive surface and a common brush 30 engaging the contact roller. The twelve sensing brushes $27a(1-12)$ correspond to the twelve digital positions available for the multiplicand, and the eight sensing brushes $28b(1-8)$ correspond to the eight digital positions available for the multiplier. The problem card 11 passes between the contact roller 29 and the sensing brushes $27a$ and $28b$, the sensing brushes being arranged in a line axially of the roller 29 so that one end of each brush engages the roller except when separated therefrom by the card 11 which is of insulating material. When a sensing brush coincides with a perforation in the card 11, the brush extends through the perforation and engages the contact roller 29. Thus, with the sensing brushes in a line, both the multiplicand and multiplier are sensed simultaneously with only those sensing brushes which correspond to a digital position in which there is a binary 1 engaging the contact roller 29. The common brush 30 continuously engages the roller 29 and connects it through appropriate timing cam switches 31 of the machine to the positive terminal of a suitable direct current voltage supply (preferably having a voltage of the order of +40 volts), such as a direct current generator 32 driven by a suitable motor 33. Consequently, when a perforation is sensed by a sensing brush during operation of the machine, that brush is suddenly connected to the positive voltage terminal. The cam switches 31 are arranged to be closed only when the card is in a correct reading position for sensing by the brushes.

The sensing brushes $27a(1-12)$ for the multiplicand are connected as shown in Fig. 2a to a set of plug hubs $33a(1-12)$, respectively, while the sensing brushes $28b(1-8)$ for the multiplier are connected to another set of plug hubs $34b(1-8)$, respectively. The common brush 30 is also connected to ground through a resistor 35 and is connected through another resistor 36 to another plug hub 37.

While the problem card 11 is passing to the sensing station, as shown in Fig. 4, the product card 13 is passing through rollers 25 and 26 to the punching station. At the punching station, sixteen punches 38c are arranged in a line to be individually actuated by corresponding punch electromagnet $39c(1-16)$. These electromagnets $39c(1-16)$ in Fig. 2a are connected between a +110 volts supply line and individual plug hubs $40c(1-16)$. The blank product card 13 is provided with product digital positions and these digital positions are located under the corresponding 16 punches. Then when a punch magnet is energized, the blank product card 13 is perforated by the corresponding punch at the corresponding digital position.

After the sensing of one problem and the punching of the corresponding product, the succeeding problems on the problem card 11 are sensed in order and their products punched in the same order in the product card 13. Thereafter the problem card 11 and the product card 13 pass through rollers 41 and 42, respectively, in Fig. 4, to the stackers 43 and 44, respectively.

Four voltage supply lines are illustrated in the circuit diagram of Figs. 2(a–j) and are labeled +110V, B1, B2 and −110V. These voltage supplies may be obtained from any suitable source and in the device described the biasing supply lines B1 and B2 preferably are −27 volts and −6 volts, respectively. A voltage line B3 is provided which is energized from a floating supply source 45 and through the cam operated switches 31. When the cam switches 31 are open, line B3 is at one value, preferably −150 volts, assuming switch 10x is closed between plug hub 37 and source 45, and when the cam switches 31 are closed, line B3 is at a more positive value, preferably slightly more positive than the −110 volts line.

The switches 10a, 10b and 10c in Fig. 1 comprise a plurality of single pole double throw switches 10a(1–12), 10b(1–8), 10c(1–16), as shown in Figs. 2c and 2d. Each of switches 10a(1–12) has one contact pluggably connected to the corresponding one of plug hubs 33a(1–12) of the record reader (Fig. 2a), and its pole pluggably connected to the corresponding one of plug hubs 46a(1–12) (Fig. 2c), which are arranged to feed the multiplicand translator. The other contact of each of switches 10a(1–12) is pluggably connected to the corresponding one of a plurality of plug hubs 47a(1–12) in the manual selector (Fig. 2b).

Each of the switches 10b(1–8) in Fig. 2d has one contact pluggably connected to the corresponding one of plug hubs 34b(1–8) of the record reader in Fig 2a, and its pole connected pluggably to the corresponding one of a plurality of plug hubs 48b(1–8) (Fig. 2d) which are arranged to feed the coincidence circuits. The other contact of each of switches 10b(1–8) is pluggably connected to the corresponding one of a plurality of plug hubs 49b(1–8) in the manual selector (Fig. 2b).

Each of switches 10c(1–16) in Fig. 2c has one contact pluggably connected to the corresponding one of plug hubs 40c(1–16) of the recorder (Fig. 2a) and its pole connected pluggably to the corresponding one of a plurality of plug hubs 50c(1–16) (Fig. 2c) which are arranged to be fed from the product translator. The other contact of each of switches 10c(1–16) is pluggably connected to the corresponding one of a plurality of plug hubs 51c(1–16 of the indicator (Fig. 2b).

As previously indicated, one contact of the switch 10x (Fig. 2c) is pluggably connected to plug hub 37 of the record reader while its pole is connected to the positive terminal of the B3 floating supply source 45. The other contact of switch 10x is pluggably connected to another plug hub 52 in the manual selector (Fig. 2b).

As is pointed out in detail hereinafter, the plug hubs 46a(1–12) and 48b(1–8) are connected through resistive circuits to ground and to −110 volts line. Consequently, as the problem card 11 is read with the switches 10a(1–12), 10b(1–8), 10c(1–16) and 10x in their upper position, the brushes 27a(1–12) and 28b(1–8) sense the perforations in the card for the multiplicand and multiplier, respectively, and when a brush extends through a perforation to engage the contact roller 29, the corresponding circuit through the corresponding one of the switches 10 is energized. Thus, the circuit through switches 10a(1–12) and 10b(1–8) are selectively energized to represent the multiplicand and multiplier, respectively. In these representations, an energized circuit represents a binary 1 and a deenergized circuit represents a binary 0 in the corresponding digital position. The circuits and components in these representations (and in all other places in the drawings) having reference characters containing the designation $a1$ correspond to the first digital position at the right end of the multiplicand; those containing $a2$ correspond to the second digital position from the right end; and so on through $a12$ which corresponds to the twelfth digital position of the multiplicand. The circuits and components having reference characters containing the designations $b1$ through $b8$ correspond to the first through the eighth digital positions from the right end of the multiplier, respectively. The circuits and components having reference characters containing the designations $c1$ through $c16$ correspond to the first through the sixteenth digital positions from the right end of the product, respectively.

As is also pointed out in more detail hereinafter, when the product of the multiplicand and multiplier is determined, the product translator selectively energizes the circuits through switches 10c(1–16) to energize the corresponding punch magnets 39c(1–16) and punch the product in the product card.

Manual selector and indicator

When it is desired to set up a problem manually and to have a visual indication of the product, the switches 10a, 10b and 10c in Fig. 1 are placed in their lower position to couple the manual selector and indicator with the multiplicand and product translators. The purpose of the manual selector shown in Figs. 1 and 2b, is to permit manual completion of selected ones of a plurality of circuits in each of two groups of circuits to select the multiplicand and the multiplier. The purpose of the product indicator is to provide a visual, easily read indication of the product as determined by the device.

Since the apparatus is designed for use with a multiplicand having up to twelve binary digits, twelve manually operable switches 53a(1–12) (Fig. 2b) are provided in the manual selector, corresponding to the twelve digital positions for the multiplicand. Each of the switches 53a-(1–12) is connected in series with an individual resistor 54a(1–12) between the +110 volts supply line and the corresponding one of plug hubs 47a(1–12). Twelve multiplicand indicator lights 55a(1–12), such as incandescent lights, are also provided, with each light corresponding to a different digital position. Each of these multiplicand indicator lights 55a(1–12) is connected between the ground and the side of the corresponding one of the selector switches 53a(1–12) which is remote from the +110 volts supply line. Thus, when the switches 10a(1–12) in Fig. 2d are in their lower position, the closure of any one of the multiplicand selector switches 53a(1–12)

completes the corresponding circuit from the +110 volts supply line through the corresponding one of resistors 53a(1-12) and plug hubs 47a(1-12) and in addition completes the corresponding circuit from the +110 volts supply line through the corresponding one of indicator lights 55a(1-12) to the ground. Thus, the closure of any one or combination of selector switches 53a(1-12) and the illumination of the corresponding indicator lights 55a(1-12) then represents a binary 1 in the corresponding digital positions of the multiplicand. An open selector switch 53a(1-12) and a corresponding non-illuminated indicator light 55a(1-12) represents a binary 0 in the corresponding digital position of the multiplicand.

Similarly, eight manual switches 56b(1-8) are provided in Fig. 2b corresponding to the eight digital positions in the multiplier. Each of the multiplier selector switches 56b(1-8) is connected in series with a corresponding one of eight resistors 57b(1-8) between the +110 volts supply line and the corresponding one of plug hubs 49b(1-8). Eight additional indicator lights 58b(1-8) are also provided to represent the multiplier and each is connected between the ground and the side of the corresponding multiplier selector switch 56b(1-8) which is remote from the +110 volt supply line. Thus, when switches 10b(1-8) in Fig. 2d are in their lower positions, closure of any one of the multiplier selector switches 56b(1-8) in Fig. 2b then completes a circuit from the +110 volts supply line through the corresponding one of resistors 57b(1-8) and plug hubs 49b(1-8), and also causes the corresponding one of indicator lights 58b(1-8) to be illuminated representing a binary 1 in the corresponding digital position of the multiplier.

To indicate the product of the multiplicand and the multiplier, sixteen more indicator lights 59c(1-16) are provided in Fig. 2b, each corresponding to a different digital position of the product. Each of the product indicator lights 59c(1-16) is connected in series with a corresponding one of sixteen resistors 60c(1-16) between the +110 volts supply line and the corresponding one of plug hubs 51c(1-16). When the product is determined by the multiplying device, the circuits through those product indicator lights corresponding to the digital position in the product at which a binary 1 appears, are completed and the illuminated lights provide an easily read visual indication of the product.

*The multiplicand translator*

The function of the multiplicand translator (Figs. 1, 2c, 2e, 2f) is to receive the multiplicand in the form of a binary number represented as a plurality of selectively energized circuits and to generate time coded voltage impulses corresponding to that number.

As previously indicated, in the time code employed in the multiplicand translator, the first microsecond time period following a starting impulse corresponds to the first digital position from the right end of the binary number to be represented; the second microsecond corresponds to the second digital position; the third microsecond corresponds to the third digital position, and so on through the twelve digits which may be handled by this apparatus. A voltage impulse in any particular microsecond represents a binary 1 in the corresponding digital position while the absence of an impulse in any microsecond time period represents a binary 0.

In the multiplicand translator, twelve resistive voltage dividers 61a(1-12) corresponding to the twelve digital positions available for the multiplicand, are connected between the —110 volts supply line and the ground as shown in Fig. 2c. Each of the plug hubs 46a(1-12) which are pluggably connected to either the record reader or the manual selector through switches 10a(1-12), is also connected to an intermediate tap 62 on the corresponding divider 61a(1-12). A second intermediate tap 63 on each divider 61a(1-12) between the first tap 62 and the —110 volts supply line is connected by the corresponding one of twelve lead wires 64a(1-12) to the translator proper of Figs. 2e and 2f. It is then evident that each second tap 63 and the corresponding one of lead wires 64a(1-12) may be at one of two voltages. So long as the corresponding one of the sensing brushes 27a(1-12) in the record reader (Fig. 2a) does not sense a perforation in the problem card or the corresponding one of selector switches 53a in the manual selector (Fig. 2b) is not closed, depending upon whether the record reader or the manual selector is to be controlling, the second tap 63 and its associated lead wire are at their more negative voltage. When a sensing brush senses a perforation or when a selector switch is closed, as the case may be, the voltage of the first intermediate tap 62 on the corresponding divider 61a is made considerably more positive to cause in turn the second tap 63 and its associated lead wire 64a(1-12) to become more positive.

The translator proper includes a multi-stage electronic commutator 65-80, in the left-hand half of Figs. 2e and 2f, which is actually a part of the product translator as well as the multiplicand translator, and twelve switching circuits 81a(1-12), in the center of Figs. 2e and 2f, corresponding to the twelve digital positions, respectively, available for the multiplicand. The commutator 65-80 has sixteen stages, the first twelve of which 65-76 are associated with the twelve switching circuits 81a(1-12), respectively, for use in translation of the multiplicand, while all sixteen stages are associated with the product translator which can accommodate a sixteen digit product. A starting impulse is received from the synchronizer indicated in Fig. 1 at the first stage 65 of the commutator in the lower left-hand corner of Fig. 2f and that impulse is passed along from stage to stage at a rate of one time period, that is, one microsecond, per stage.

Each commutator stage (Figs. 2e and 2f) comprises a pentode 82, such as a Western Electric 6AK5 tube and a triode 83, preferably half of a twin triode such as a Western Electric 2C51 tube, and their associated circuits. The anode of the pentode 82 is connected to the +110 volts supply line through a resistor 84 and an inductor 85. A condenser 86 is connected from the anode of the pentode 82 to the ground. The cathode of the pentode 82 is connected to the ground; the suppressor grid is connected to the cathode; and the screen grid is connected to the +110 volts supply line. The control grid of the pentode 82 of the first stage 65 of the commutator is connected through a resistor 87 to the biasing voltage line B2 and also through a coupling condenser 88 to a coaxial line 89 through which the starting impulse is delivered. The control grid of each of the pentodes 82 of the other stages is connected to the cathode of the triode 83 of the next lower stage arranged in a cathode follower circuit.

The output of each pentode 82 of the commutator 65–80 is delivered to the corresponding triode 83 by a coupling from the anode of the pentode 82 to the control grid of the triode 83 through a coupling condenser 90 and a first diode 91, preferably a germanium crystal diode, such as a Sylvania 1N34 crystal, which offers its lower impedance to current flow toward the grid. The junction point between the coupling condenser 90 and the first diode 91 is connected through a resistor 92 to the −110 volts supply line. This same junction point is also connected through a second diode 93, also preferably a germanium crystal diode, to the biasing supply line B2 with the diode 93 offering its lower impedance to current flow toward the biasing line B2. The same junction point is further connected through a third diode 94, also preferably a germanium crystal diode, to the biasing voltage line B1, with the third diode 94 offering its higher impedance to current flow toward the biasing line B1. The control grid of each triode 83 is also coupled by a condenser 95 to a synchronous impulse supply line S1 which is connected to the synchronizer to be later described. The triode control grid is also connected through a fourth diode 96, also preferably a germanium crystal diode, and a resistor 97 in series therewith, to a clamp impulse supply line K1, which is connected to the synchronizer, with the fourth diode 96 offering its lower impedance to current flow toward the clamp supply line K1. The anode of each triode 83 is connected through a resistor 98 to the +110 volts supply line while the cathode is connected to the −110 volts supply line through a load resistor 99 in a cathode follower circuit which differs somewhat from the conventional cathode follower in that the cathode is tied to a point substantially negative with respect to the grid return circuits. This permits impulses to be transmitted more readily by the cathode follower.

A positive rectangular, low impedance, synchronous voltage impulse is to be supplied through the synchronous impulse line S1 from the synchronizer once each time period; that is, once each microsecond. This synchronous impulse is arranged to be approximately one-third of a microsecond in duration and a starting impulse is arranged to occur simultaneously with every sixteenth synchronous impulse. Conincident with the termination of each synchronous impulse, a negative voltage impulse having a steep wave front is supplied through the clamp line K1 from the synchronizer. The function and relative magnitudes of the synchronous and clamp impulses are described hereinafter in the discussion of the operation of the commutator.

The circuit arrangement, including the pentode 82, triode 83 and diodes 91, 93, 94 and 96, in each commutator stage, as just described, constitutes a synchronous pulse delay circuit. Considering, for example, any given one of commutator stages 65–80 (Fig. 2f), let it be assumed that the grid of triode 83 is originally at the potential of bias supply line B1 and condenser 95 is charged to the difference between the voltage of line B1 and the voltage of line S1. Now, because of the connection of the −110 volts line through resistor 92 to the junction between the condenser 90 and the first diode 91, that junction tends to be highly negative. However, the connection of the third diode 94 prevents the junction from being more negative than biasing line B1 which in this particular arrangement may be about −27 volts. The third and first diodes together also prevent the grid of the triode 83 from becoming more negative than biasing line B1. It is then evident that while the pentode 82 is non-conductive, the condenser 90, coupling the anode of the pentode 82 to the control grid of the triode 83, is charged to the voltage difference between the +110 volts supply line and the biasing line B1. When a positive impulse is impressed on the control grid of the pentode 82, it becomes conductive and the voltage at its anode drops. The coupling condenser 90 then discharges but its terminal remote from the pentode 82 necessarily remains at the voltage level of the biasing line B1. At the termination of the positive impulse at the grid, the pentode 82 again becomes non-conductive and the voltage of its anode rises. As a result, a positive voltage impulse is passed through the coupling condenser 90 and the first diode 91 to the grid of the triode 83 and also to the condenser 95. However, through the action of the second diode 93, the maximum voltage of the positive impulse thus delivered to the grid of the triode 83 is limited to the voltage level of the biasing line B2, which level is more positive than that of biasing line B1.

Although the duration of the positive impulse passed through the coupling condenser 90 is relatively short, it changes the charge on the condenser 95 coupling the grid of the triode 83 to the synchronous impulse line S1 to establish the grid at the level of line B2. The purpose of the first diode 91 is to permit the voltage of the terminal of the coupling condenser 90 which is remote from the pentode 82 to return to the level of biasing line B1 without removing such charge from the condenser 95 and altering the voltage of the grid of the triode 83. The tendency of the remote terminal of the coupling condenser 90 to return to the level of line B1 is the result of the combination of two effects, one being the second overshoot of the anode pulse of the pentode 82 and the other being the action of the resistor 92 connecting that terminal to the −110 volts supply line. If this remote terminal has not completely returned to the level of line B1 by the time the next clamp impulse occurs, the return is completed by that clamp impulse. It is desirable that the remote terminal of the condenser 90 be substantially returned to the level of line B1 before the next clamp impulse occurs, for if the return is accomplished primarily by the clamp impulse, a spurious negative impulse is generated in the anode circuit of pentode 82, which is obviously undesirable.

From the foregoing, it is evident that if the pentode 82 of the given stage remains non-conductive, the grid of the triode 83 is at the voltage level of biasing line B1. However, when the pentode 82 becomes conductive as the result of a positive impulse on its grid, a voltage pedestal is established on the grid of the triode 83 of the same stage at the level of biasing line B2. The constants of the load circuit of the pentode 82 are chosen to give the optimum wave shape for establishing the pedestal. It is to be noted that the voltage pedestal is established as a result of the pentode 82 becoming non-conductive rather than as a result of the pentode becoming conductive upon application of the positive impulse on its grid.

The magnitude of a synchronous impulse on line S1 is such that if the grid of the triode 83 in the given commutator stage is at the voltage level of biasing line B1, prior to the synchronous impulse, the impulse produced at the cathode of triode 83 will not raise the voltage of the control grid of the pentode 82 of the next stage above cut off. But if the grid of the triode 83 is at the level of biasing line B2 prior to the synchronous impulse (i. e., a voltage pedestal is present), the impulse produced at the cathode of triode 83 causes the pentode 82 in the succeeding stage to become conductive.

As a synchronous impulse terminates, a clamp impulse is delivered on line K1. This highly negative clamp impulse acts through the fourth diode 96 and resistor 97 to change the charge on the condenser 95 to return the grid of the triode 83 to the voltage level of the biasing line B1, thus terminating the voltage pedestal. The fourth diode 96 isolates the clamp supply line K1 from the rest of the grid circuit of the triode 83 except during the clamp impulse. The resistor 97 in series with the fourth diode 96 serves as a decoupling resistor to improve the isolation of the clamp circuit.

It has thus been shown that a properly timed positive impulse on the grid of the pentode 82 in any given stage causes a voltage pedestal to be established on the grid of the triode 83 of the same stage. As previously pointed out, this pedestal is not established until after the termination of the positive grid impulse which initiated it. This pedestal permits the succeeding synchronous impulse to be effectively transmitted through the triode 83 to provide the positive grid impulse for the pentode 82 of the succeeding stage. This positive grid impulse on the pentode of the succeeding stage is, in turn, effective in the manner just described to cause that succeeding stage to provide a positive grid impulse on the pentode of the second succeeding stage at the time of the second succeeding synchronous impulse. It can be seen that these commutating circuits comprise a chain of delay stages, whose delay is determined by the repetition rate of the synchronous impulses. The repetition rate of the synchronous impulses in this particular device is one million impulses per second affording a delay of one microsecond per stage. If a positive grid impulse is provided for the first stage coincident with every sixteenth synchronous impulse, it is evident that this impulse will become a commutating impulse which will be passed along from stage to stage at a rate of one stage per microsecond. Under these conditions, with sixteen stages as shown, a commutating impulse is always present in one of the stages, a new commutating impulse being introduced to the first stage as the preceding commutating impulse leaves the last stage. To introduce this new commutating impulse, a starting impulse is provided through coaxial line 89 coincident with every sixteenth microsecond.

It will be evident that for other applications, these circuits may be used as a chain of delay stages for storage and transmission of timed impulses and that as many impulses may be transmitted and stored simultaneously as there are stages. It is also possible for delay applications to eliminate the cathode follower circuit incorporating triode 83 in each stage and connect the junction between condenser 95 and diodes 91 and 96 directly to the grid of the pentode 82 of the following stage. The commutator stages 65–67, 75–77 and 80 are shown in detail while stages 68–74 and 78 and 79 are represented by blocks in Figs. 2e and 2f, although for purposes of clarity triode 83 for stage 77 is assumed to be in the rectangle 78 while triode 83 for stage 79 is shown in detail with the corresponding triode 83 for stage 80.

The resistors 98 in the anode circuits of the triodes 83 are provided to eliminate parasitic oscillations which might be produced when both sides of a twin triode tube are employed in cathode follower circuits as they are in this arrangement.

As previously set forth, the triodes 83 of successive stages of the commutator 65–80 deliver effective output impulses successively at one microsecond intervals. The first twelve stages 65–76 are arranged to correspond to the twelve digital positions, beginning at the right end and progressing to the left end, of the binary multiplicand. Consequently, the commutator may be considered as delivering a positive output impulse for each digital position of the multiplicand.

A multiplicand bus M1 is provided for carrying the time coded impulses representing the multiplicand as they are developed in the multiplicand translator. Interposed between the multiplicand bus M1 and each of the first twelve stages 65–76 of the commutator is the corresponding one of the switching circuits 81a(1–12). Each switching circuit 81a(1–12) is responsive to the voltage on the corresponding one of the lead wires 64a(1–12) from the voltage dividers 61a(1–12) of Fig. 2c, to determine whether or not the impulses supplied by the corresponding commutator stage is transmitted to the multiplicand bus M1.

As explained hereinbefore, the lead wires 64a(1–12) in Figs 2e and 2f from the voltage dividers 61a(1–12) in Fig. 2c are individually at either of two voltages. If a lead wire is at the more positive of its two voltages, it represents a binary 1 in the corresponding digital position of the multiplicand. If a lead wire is at its more negative voltage level, it represents a binary 0 at the corresponding digital position. The switching circuits 81a(1–12) in Figs. 2e and 2f are then arranged so that if a lead wire 64a(1–12) is at its more positive voltage, the impulse from the corresponding commutator stage is passed to the multiplicand bus M1. If the lead wire is at its more negative voltage, the commutator impulse is not passed to the multiplicand bus M1.

With respect to any one of the switching circuits 81a(1–12), Figs. 2e and 2f, the corresponding one of the lead wires 64a(1–12) from the corresponding one of the voltage dividers 61a(1–12) is connected through a resistor 99 and a diode 100, preferably a germanium crystal diode, to the cathode of the triode 83 of the corresponding one of the commutator stages 65–76, with the diode 100 offering its lower impedance to current flow toward the cathode. A condenser 101 is connected in parallel with the diode 100. The junction point between the diode 100 and the resistor 99 is also connected through a second diode 102, also preferably a germanium crystal diode, to a line 103 common to three others of the switching circuits with the diode 102 offering its lower impedance to current flow toward line 103. Thus, the first four switching circuits have a common line 103 to which their second diodes 102 are connected, as do the second and third groups of four switching circuits. Each group of four switching circuits has its common line 103 connected by still a third diode 104, also preferably a germanium crystal diode, to the multiplicand bus M1 with the third diode 104 offering its lower impedance to current flow toward bus M1. This grouping is made to minimize the effect of low back resistance of the parallel connected diodes. In addition, the multiplicand bus MI is connected as shown in Fig. 2g through still another diode 105 and a resistor 106, to the clamp impulse line KI.

When any one of the lead wires 64a(1–12) is at its more positive voltage, the diodes 102 and 104 leading to the multiplicand bus MI are essentially direct coupled to the cathode of the triode 83 of the corresponding commutator stage by the action of the first diode 100 of the switching circuit and the condenser 101 in parallel therewith. On the other hand, when the lead wire is at its more negative voltage, the coupling is substantially a condenser coupling and the normal voltage level of the multiplicand bus MI is such that the second and third diodes 102 and 104 of the switching circuits act essentially as open switches to prevent the commutator impulse from passing to the multiplicand bus MI.

When positive impulses are transmitted through the diodes 102 and 104 to the multiplicand bus MI, the potential of that bus rises accordingly. Then the clamp impulse, occurring at the end of the transmitted impulse, acts through diode 105 and resistor 106 to restore the multiplicand bus to its original voltage level. Thus, there appears on the multiplicand bus MI a series of voltage impulses spaced in time in accordance with the established settings to represent the multiplicand.

Figure 2G:
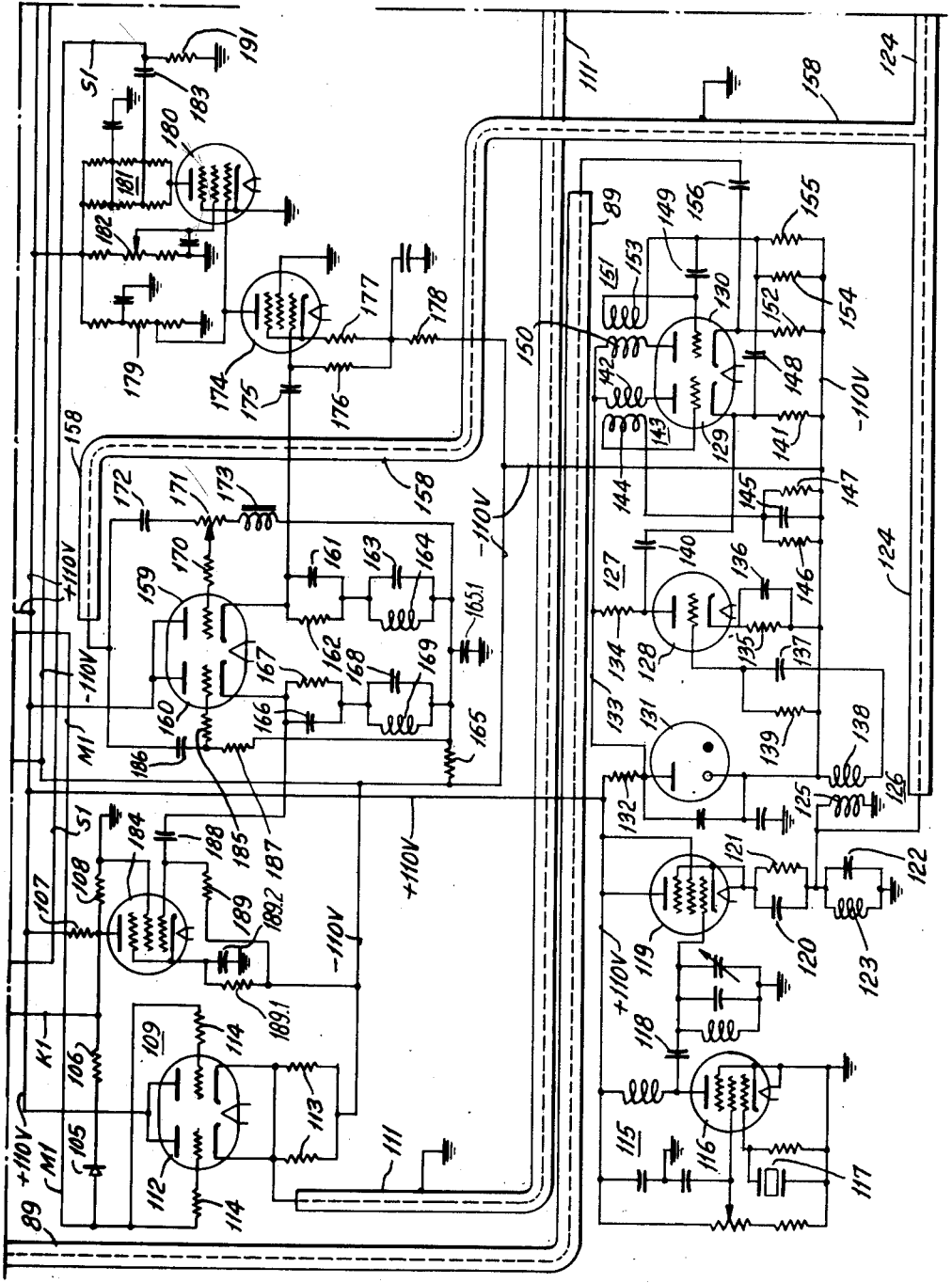

The multiplicand bus MI supplies the coded impulses to a cathode follower circuit 109 in Fig. 2g, the output of which is fed into a suitable coaxial line 111 for transmission to the coincidence circuits. The cathode follower circuit 109 incorporates a pair of parallel connected triodes 112, preferably a twin triode, such as a Western Electric 2C51 tube. The anodes of the triodes 112 are connected together to the +110 volts supply line. The cathodes are connected through parallel load resistors 113 to the −110 volts supply line. The cathodes are also connected to the coaxial line 111 so that impulses appearing across the load resistors 113 are fed into the coaxial line. The grids of the triodes 112 are connected through individual resistors 114 to the multiplicand bus MI. Thus, the impulses supplied from the multiplicand bus MI pass through the low impedance cathode follower circuits to the coaxial line 111. The resistors 114 in the grid circuits of the triodes 112 are adapted to eliminate parasitic oscillations which otherwise might be established by the use of both halves of a twin triode in cathode follower circuits.

*Synchronizer for translator*

The synchronizer indicated in Fig. 1 and shown in Figs. 2g and 2i is used in connection with both the multiplicand translator and the coincidence circuits. However, only that portion of the synchronizer associated with the multiplicand translator is to be considered at this time.

A crystal oscillator circuit 115 of a conventional design is provided in Fig. 2g which employs a pentode 116, such as an RCA 50B5 tube, and a crystal 117 arranged to control the frequency of the oscillator to provide a one megacycle per second frequency output. The output of the crystal oscillator is coupled by a condenser 118 to the grid of another pentode 119, such as an RCA 50B5 tube. The anode of the pentode 119 is connected to the +110 volts supply line, while the cathode is connected through a condenser 120 and resistor 121 in parallel therewith and thence through another condenser 122 and inductor 123 in parallel therewith to the ground. The parallel connected condenser 122 and inductor 123 are arranged as a resonant circuit having a resonant frequency of one megacycle per second. The one megacycle alternating voltage output taken from the junction point between the parallel connected condenser 120 and resistor 121 and the parallel connected condenser 122 and inductor 123 is fed into a coaxial line 124. The output is also fed to the primary winding 125 of a high frequency transformer 126.

The output of the transformer 126 is used to supply the one megacycle alternating voltage to a counting down circuit 127. The counting down circuit includes a first tube 128 arranged to translate the alternating voltage into a series of negative voltage impulses having a one megacycle frequency, a second tube 129 arranged in a blocking oscillator circuit responsive to these impulses and a third tube 130 arranged in a second blocking oscillator circuit responsive to the output of the first blocking oscillator circuit. The first tube 128 is preferably a triode, such as an RCA 6C4 tube, while the second and third tubes 129 and 130 are also triodes, preferably contained in a single envelope as in an RCA 12AU7 tube.

A voltage regulator tube 131, such as an RCA VR150 tube, is also provided having its anode connected through a resistor 132 to the +110 volts supply line while its cathode is connected to the −110 volts supply line. An auxiliary voltage supply line 133 is connected to the anode of the voltage regulator tube 131 so that a substantially constant voltage appears between the auxiliary supply line 133 and the −110 volts supply line.

The anode of the first tube 128 is connected through a resistor 134 to the auxiliary supply line 133 while its cathode is connected through a resistor 135 and a condenser 136 in parallel therewith, to the −110 volts supply line. The grid of the first tube 128 is connected through a condenser 137 to one terminal of a secondary winding 138 of the transformer 126, the other terminal of which is connected to the −110 volts supply line. The grid of the first tube 128 is also connected through a grid resistor 139 to the −110 volts supply line. With this arrangement, the first tube 128 is grid-leak biased normally below cutoff. However each positive peak of the alternating voltage supplied through transformer 126 causes the grid of the first tube 128 to become positive, thereby producing a negative voltage impulse at the anode of that tube. This negative impulse occurs at a frequency of one megacycle per second, or, in other words, a negative impulse is produced once each microsecond.

The negative impulse provided at the anode of the first tube 128 is fed through a coupling condenser 140 to the cathode of the second tube 129. The cathode of this second tube 129 is also connected through a resistor 141 to the −110 volts supply line while the anode is connected through a primary winding 142 of another transformer 143 to the supply line 133. The grid of the second tube 129 is connected through a secondary winding 144 of the transformer 143 and a timing condenser 145 to the −110 volts supply line. A pair of resistors 146 and 147 are connected in parallel with each other and with the timing condenser 145.

In considering the operation of the first blocking circuit employing tube 129, it is assumed that the timing condenser 145 is at first charged with a polarity causing the grid of tube 129 to be highly negative, thereby maintaining the tube 129 non-conductive. A negative impulse fed to the cathode of the tube 129 from the tube 128 is then insufficient to cause the tube 129 to become conductive. However, the timing condenser 145 gradually discharges through the resistors 146 and 147 at such a rate that by the time the fourth impulse is received from the tube 128, that is, at the end of four microseconds, the timing condenser 145 is sufficiently discharged that the fourth impulse causes the tube 129 to become conductive. When tube 129 becomes conductive, the transformer 143 produces a voltage causing the grid of tube 129 to become even more positive with respect to the cathode. As a result, a relatively large grid current flows causing the timing condenser 145 to be recharged with a polarity which makes the grid highly negative when the impulse supplied from the tube 128 has subsided. The tube 129 then becomes non-conductive and remains non-conductive until the fourth succeeding impulse from tube 128 is received. A positive voltage impulse is thus produced once each four microseconds across the cathode resistor 141 associated with the tube 129.

The voltage impulses produced across the resistor 141 are transferred through a second timing condenser 148 and another condenser 149 to the grid of the tube 130 in the second blocking oscillator circuit. The anode of tube 130 is connected through a primary winding 150 of another transformer 151 to the auxiliary supply line 133. The cathode of tube 130 is connected through a resistor 152 to the −110 volts supply line. The secondary winding 153 of the transformer 151 is connected in parallel with the condenser 149 between the grid of tube 130 and the second timing condenser 148, the condenser 149 forming a low impedance path for the impulse from resistor 141 as contrasted with the high impedance path through the secondary winding 153. A pair of resistors 154 and 155 are connected in parallel with each other from the junction point between the condensers 148 and 149 to the −110 volts supply line.

In considering the operation of the second blocking oscillator circuit including tube 130, it is assumed that the second timing condenser 148 is at first charged with a polarity causing the grid of tube 130 to be highly negative, thereby maintaining the tube 130 non-conductive. The grid is sufficiently negative that a positive voltage impulse provided across resistor 141 in the first blocking circuit is insufficient to cause the tube 130 to become conductive. However, the second timing condenser 148 begins to discharge at a predetermined rate through the resistors 141, 154 and 155. This rate is such that by the time the fourth voltage impulse appears at resistor 141, that is, sixteen microseconds later, the second timing condenser 148 is sufficiently discharged that the fourth voltage impulse at resistor 141 causes tube 130 to become conductive. When tube 130 becomes conductive, the transformer 151 produces a voltage causing the grid of tube 130 to become highly positive so that a relatively high grid current flows resulting in a recharging of the second timing condenser 148 with a polarity which causes the grid of tube 130 to become highly negative when the voltage impulse at resistor 141 has subsided. In this manner, a positive voltage impulse is produced across the cathode resistor 152 once for each sixteen microseconds.

The output impulses of the counting down circuit 127, which is, in effect, the output impulses of the second blocking oscillator, is coupled through a condenser 156 to the coaxial line 89. These output impulses, which are the starting impulses, are conducted by the coaxial line 89 to the grid of the first pentode 82 in the first stage 65 of the commutator in Fig. 2f.

It is to be remembered that the one megacycle alternating voltage output of tube 119 in Fig. 2g is also fed into the coaxial line 124. Through a branch 158 of this coaxial line 124, the alternating voltage is supplied to the inputs of a pair of triodes 159 and 160. The triodes 159 and 160 are preferably contained in a single envelope such as in a Western Electric 2C51 tube. The anodes of tubes 159 and 160 are connected together to the +110 volts supply line while their cathodes are individually connected to the −110 volts supply line. The cathode of tube 159 is connected through a condenser 161 and a resistor 162 in parallel with each other, a condenser 163 and inductor 164 in parallel with each other, and a resistor 165 to the −110 volts supply line. The cathode of tube 160 is connected through a condenser 166 and a resistor 167 in parallel therewith, a condenser 168 and inductor 169 in parallel with each other, and the resistor 165 to the −110 volts supply line. The inductor 164 and condenser 163 are arranged in a resonant circuit having a resonant frequency of one megacycle per second, as are the condenser 168 and inductor 169.

The grid of tube 159 is connected through a resistor 170 to an intermediate tap on a resistor 171 which in turn is connected in series with a condenser 172 and an inductor 173 between the terminal of the coaxial line 158 and the end of resistor 165 which is remote from the −110 volts supply line. Thus, the alternating voltage supplied through the coaxial line 158 is applied to the grid of tube 159. The arrangement of the resistor 171, condenser 172 and inductor 173 permits an adjustment of the phase of the alternating voltage applied to the grid of tube 159 for a purpose to be described hereinafter.

The alternating voltage output appearing at the cathode of tube 159 is fed through an A. C. coupling to another tube 174, which is preferably a Western Electric 6AK5 tube. The A. C. coupling is furnished by a condenser 175 connected between the cathode of tube 159 and the control grid of tube 174, and a resistor 176 connected from the control grid of tube 174 to a point intermediate a pair of resistors 177 and 178 which are in series between the cathode of tube 174 and the −110 volts supply line. The anode of tube 174 is connected to an intermediate point on a voltage divider 179 which is connected between the +110 volts supply line and the ground. Thus, a negative voltage impulse appears at the anode of tube 174 once each cycle of the alternating voltage which is once each microsecond.

The anode of tube 174 is also connected to the control grid of another tube 180, which is preferably a pentode such as an RCA 50B5 tube. The cathode and suppressor grid of tube 180 are connected together to the ground while the anode is connected through a resistor network 181 to the +110 volts supply line. The screen grid of tube 180 is connected to an intermediate point on another voltage divider 182 which, in turn, is connected between the +110 volts supply line and the ground.

Inasmuch as the anode of tube 174 is connected both to the control grid of tube 180 and to an intermediate point on the divider 179, tube 180 is normally conductive with the control grid somewhat positive. When tube 174 becomes conductive, the resulting negative voltage impulse at its anode is impressed on the control grid of tube 180 to drive that grid below cutoff resulting in a positive voltage impulse at the anode of tube 180. The constants of the circuits are arranged so that the positive impulse at the anode of tube 180 lasts for approximately one-third of a microsecond with approximately two-thirds of a microsecond between successive impulses. Because the control grid of tube 180 is driven between cutoff and grid conduction, the output voltage appearing at the anode of tube 180 is a substantially rectangular wave.

It is to be noted that the resistor 177 in the cathode circuit of tube 174 is of such value that a sufficient self-biasing action is provided thereby to protect tube 174 as well as tube 180 from damage in the event of accidental failure of excitation from tube 159.

The output of tube 180 is taken from an intermediate point on the resistor network 181 and applied through a coupling condenser 183 and resistor 191 to the synchronous impulse supply line S1 for the commutator shown in Figs. 2e and 2f. This synchronous impulse occurs once each microsecond beginning concurrently with the starting impulse. The anode circuit resistance for tube 180 is of a relatively low value to provide a low impedance output.

The tube 160 in Fig. 2g is also fed with an alternating voltage from the coaxial line 158 and is used in conjunction with another tube 184, such as an RCA 50B5, to develop the clamp impulse. The grid of tube 160 is connected through a resistor 185 to the junction point between a condenser 186 and a resistor 187 which are connected in series in the order named between the terminal of coaxial line 158 and the end of resistor 165 which is remote from the —110 volts supply line. A decoupling condenser 165.1 is connected from this remote end of resistor 165 to ground. The cathode of the tube 160 is connected through a condenser 188 to the control grid of the tube 184 which grid is also connected through a resistor 189 to the —110 volts line. The anode of tube 184 is connected to the point intermediate resistors 107 and 108 in series from the +110 volts supply line to the ground. The cathode of tube 184 is connected through a resistor 189.1 to the —110 volts line and through a condenser 189.2 to ground.

Tube 184 is grid-leak biased and the time constants involved in the condenser 188 and the resistor 189 are such that only the peak of the alternating voltage sine wave causes tube 184 to become conductive. Therefore, a narrow negative voltage impulse appears at the anode of tube 184 at a time corresponding to the positive peak of the one megacycle alternating voltage from tube 160. The phase adjustment provided for the synchronous impulse by the circuit comprising resistor 171, condenser 172 and inductor 173, is so arranged that the narrow negative clamp impulse of relatively high amplitude occurs at the end of each synchronous impulse. This clamp impulse is taken from the anode of tube 184 and is applied to the clamp supply line K1 for the commutator in Figs. 2e and 2f. Since the clamp line K1 is connected to a point between resistors 107 and 108, which is slightly above ground, the rest potential of the clamp line is sufficiently positive to avoid clipping the synchronous impulses on the grids of triodes 83.

Coincidence circuits

The function of the coincidence circuits is to receive the multiplicand in the form of time coded impulses as generated by the multiplicand translator, and to multiply all of the digits of the multiplicand by each digit individually of the multiplier, and to place the partial products thus obtained on different output lead lines corresponding to the columnar position to be occupied by each partial product during the summation thereof to obtain the total product. This function is accomplished by providing eight coincidence circuits 190b(1-8) in Figs. 2h and 2j, one for each of the eight digital positions available for the multiplier and applying thereto the time coded impulses representing the multiplicand. Each of the coincidence circuits 190b(1-8) is associated with the lead wire pluggably connected between the corresponding plug hub 49b(1-8) in Fig. 2d and the corresponding plug hub 34b(1-8) of the record reader in Fig. 2a or the corresponding plug hub 49b(1-8) of the manual selector in Fig. 2b. This wire, as explained hereinafter, is energized to represent a binary 1 or is deenergized to represent a binary 0. The arrangement is such that if a binary 1 is present in the corresponding digital position of the multiplier, the coincidence circuit passes the multiplicand impulses through to its output line. On the other hand, if a binary 0 is present at the corresponding digital position in the multiplier, the coincidence circuit does not pass, in effect, the multiplicand impulses to its output line.

Eight voltage dividers 192b(1-8) in Fig. 2d, corresponding to the eight digital positions for the multiplier, are connected in parallel with each other between the —110 volts supply line and the ground. An intermediate tap 193 on each of these dividers is connected to the corresponding plug hub 49b(1-8), which is connected to either the record reader or the manual selector, as the case may be. A second tap 194 on each divider 192b(1-8) intermediate to the first tap 193 and the —110 volts supply line, is connected by the corresponding one of a group of multiplier lead wires 195b(1-8) to the corresponding one of the coincidence circuits 190b(1-8) in Figs. 2h and 2j. When the multiplier is set up either by the record reader or the manual selector, the first tap 193 on each of the dividers 192b(1-8) in Fig. 2d corresponding to a digital position in which a binary 1 appears, is raised to a more positive voltage level. Consequently, the second tap 194 on each divider has two different voltage levels. If a binary 0 is present in the corresponding digital position, the second tap 194 is at its more negative voltage. If a binary 1 is present at the corresponding digital position, the second tap 194 is at its more positive voltage. Thus, the multiplier is represented by lead wires 195b(1-8) and the voltage levels thereof.

The time coded impulses representing the multiplicand are, as previously indicated, transmitted from the multiplicand translator through a coaxial line 111 (Figs. 2g, 2i and 2h). The output of the coaxial line 111 is supplied to a synchronous delay circuit in Fig. 2h similar to that discussed in connection with each of electronic commutator stages 65–80 in the multiplicand translator in Figs. 2e and 2f. The delay circuit in Fig. 2h includes a tube 196, preferably a pentode such as a Western Electric 6AK5 tube, having its cathode grounded and its anode connected through a resistor 197 and an inductor 198 to the +110 volts supply line. The anode is also connected through a condenser 198.1 to ground. The screen grid of the pentode 196 is also connected to the +110 volts supply line and the suppressor grid is connected to the cathode while the control grid is connected to the coaxial line 111. The anode of pentode 196 is also connected through a coupling condenser 199, a first diode 200 and individual resistors 201 and 202 to the grids of both halves 203 and 204 of a twin triode, such as an RCA 12AU7 tube. The first diode 200 offers its lower impedance to current flow toward the grids of tubes 203 and 204. The junction point between the coupling condenser 199 and the first diode 200 is connected through a resistor 205 to the −110 volts supply line, and through a second diode 206 to the biasing line B2, with the second diode 206 offering its lower impedance to current flow towards biasing line B2. The same junction point is also connected to biasing line B1 through a third diode 207 which offers its lower impedance to current flow from biasing line B1. The terminal of the first diode 200 remote from the coupling condenser 199 is connected through a fourth diode 208 and a resistor 209 to another clamp impulse supply line K2 with the fourth diode offering its lower impedance to current flow toward line K2. The same terminal of the first diode 200 is also connected through a condenser 210 to another synchronous impulse supply line S2. The clamp and synchronous impulses on supply lines K2 and S2, while produced by a different part of the synchronizer, coincide with the clamp and synchronous impulses on lines K1 and S1 respectively. The four diodes 200, 206, 207 and 208 are all preferably germanium crystal diodes.

The anodes of tubes 203 and 204 in the delay circuit in Fig. 2h are both connected to the +110 volts supply line. The cathodes of tubes 203 and 204 are connected together and through a pair of resistors 211 and 212 in parallel to the −110 volts supply line. An output lead 213 is also connected to the cathodes of tubes 203 and 204. Thus, these tubes are arranged in a cathode follower circuit.

It is then apparent that the only substantial difference in this delay circuit in Fig. 2h from that used in the commutator in Figs. 2e and 2f is that both sides 203 and 204 of the twin triode are employed in the cathode follower circuit instead of just one side. In addition, the resistors employed in the anode circuits of the triodes in the commutator delay line in Figs. 2e and 2f are omitted in Fig. 2h but instead resistors 201 and 202 are included in the grid circuits to accomplish the same function. However, the delay circuit in Fig. 2h functions in the same manner as described for the delay circuit in Fig. 2f and is effective to reshape the multiplicand impulses received over coaxial line 111 and feed them to the coincidence circuits 190b(1–8) through the cathode follower circuit which acts as an impedance transformer so that the coincidence circuits are fed by a low impedance circuit. It also provides a delay of exactly one microsecond in the multiplicand impulses which must be remembered later on in interpreting the results.

The lead 213 then carries the multiplicand in the form of time coded impulses and is coupled to all of the eight coincidence circuits 190b(1–8) in Figs. 2h and 2j corresponding to the eight digital positions available for the multiplier. The coincidence circuits 190b(1–8) are, in essence, simply cathode follower circuits, each of which is coupled to both the multiplicand lead 213 and the corresponding one of the multiplier lead wires 195b(1–8). In Fig. 2h the coincidence circuits 190b7 and 190b8 corresponding to the seventh and eighth digital positions from the right end of the binary multiplier are shown in detail. The remaining six coincidence circuits 190b(1–6) are exactly the same as the two shown in detail but are represented by blocks.

The eighth coincidence circuit 190b8 incorporates a triode 214, preferably one-half of a twin triode, such as a Western Electric 2C51 tube, the other half of which is incorporated in the adjacent seventh coincidence circuit 190b7. The anode of the triode 214 is connected to the +110 volts supply line while the cathode is connected through a load resistor 216 to the −110 volts supply line. The grid of the triode 214 is connected through a resistor 217 and a condenser 218 to the multiplicand lead 213. A crystal diode 219 is connected in parallel with the condenser 218 in a manner to offer its lower impedance to current flow toward the multiplicand lead 213. The junction point between the resistor 217 and the condenser 218 is connected through another resistor 220 to the corresponding multiplier lead 195b8.

The output of each of the coincidence circuits 190b(1–8) in Figs. 2h and 2j is applied to a corresponding one of eight lines 221ab(1–8) interconnecting the eight coincidence circuits 190b-(1–8) and eight corresponding adding boxes AB(1–8). Each line 221ab(1–8) is connected to the cathode of the triode 214 of the corresponding coincidence circuit.

When a multiplier lead 195b(1–8) is at its more positive voltage, representing a binary 1 in the corresponding digital position of the multiplier, the voltage of the grid of the associated triode 214 is determined by the voltage of the multiplicand lead 213 because of the action of the diode 219 in parallel with the condenser 218 coupling the grid to the multiplicand lead 213. This diode 219 does not allow the grid of the triode 214 to become more positive than the multiplicand lead 213 although the voltage of the multiplier lead 195b(1–8) may tend to be somewhat more positive than that of the multiplicand lead 213. When this condition prevails, the cathode follower circuit of triode 214 is essentially D. C. coupled to the multiplicand lead 213 and the voltage levels of the output lines 221ab(1–8) are such that the associated adding box AB(1–8) is actuated by each of the multiplicand impulses.

When a multiplier lead 195b(1–8) is at its more negative voltage, representing a binary 0 in the corresponding digital position of the multiplier, the negative voltage of the multiplier lead makes the grid voltage sufficiently negative to render the impulses on the output line 221ab(1–8) of the cathode follower circuit ineffective to actuate the associated adding box AB(1–8). Thus, the coincidence circuit does not, in effect, pass the multiplicand impulses on to the associated adding box.

From the foregoing, it is evident that all of the digits of the multiplicand, as manifested by the time coded impulses on the multiplicand lead 213, are multiplied by each digit, individually, of the multiplier through the action of the coincidence circuits 190b(1-8), and the partial products in the form of time coded impulses appear on different output lines 221ab(1-8) of the coincidence circuits. Thus, a binary 0 in a given digital position of the multiplier prevents the corresponding coincidence circuit from passing effectively the time coded impulses of the multiplicand so that no effective impulses, representing the product of binary 0 and the multiplicand, appear on the corresponding one of the output lines 221ab(1-8). On the other hand, a binary 1 in a given digital position of the multiplier permits all of the time coded impulses of the multiplicand to pass through the corresponding coincidence circuit so that effective impulses representing the product of binary 1 and the multiplicand appears on the corresponding one of the output lines 221ab(1-8). Thus, line 221ab1 carries the product of the multiplicand and the first digit at the right end of the multiplier; line 221ab2 carries the product of the multiplicand and the second digit from the right end of the multiplier; and so on through line 221ab8 which carries the product of the multiplicand and the eighth digit from the right end of the multiplier.

Adding boxes

The function of the adding boxes AB(1-8) in Figs. 2h and 2j is to receive the partial products obtained by the coincidence circuits 190b(1-8) and appearing on lines 221ab(1-8), and add them with respect to their proper columnar positions to obtain the total product of the entire multiplicand and multiplier. To this end, eight adding boxes AB(1-8) corresponding to the coincidence circuits 190b(1-8) are provided. The adding boxes AB(1-8) are connected in a series chain with the output of the eighth adding box AB8, corresponding to the eighth coincidence circuit 190b8, being fed to an input of the seventh adding box AB7, the output of which is fed to the sixth adding box AB6 and so on through the chain. In addition, an input of each adding box is connected by the corresponding line 221ab(1-8) to the corresponding coincidence circuit 190b(1-8).

The function of an individual adding box is to accept two binary numbers in time coded impulse form and to compute and deliver the sum of these two numbers in a similar form. Thus, each adding box in the series chain, except the eighth, receives a binary number representing the output of the preceding adding box, i. e., the next higher box, and a second binary number representing the output of the corresponding coincidence circuit. The eighth adding box AB8 receives only the output of the corresponding coincidence circuit 190b8. As will be explained, the output of the first adding box AB1 is the total product of the multiplier and multiplicand.

Figure 5:
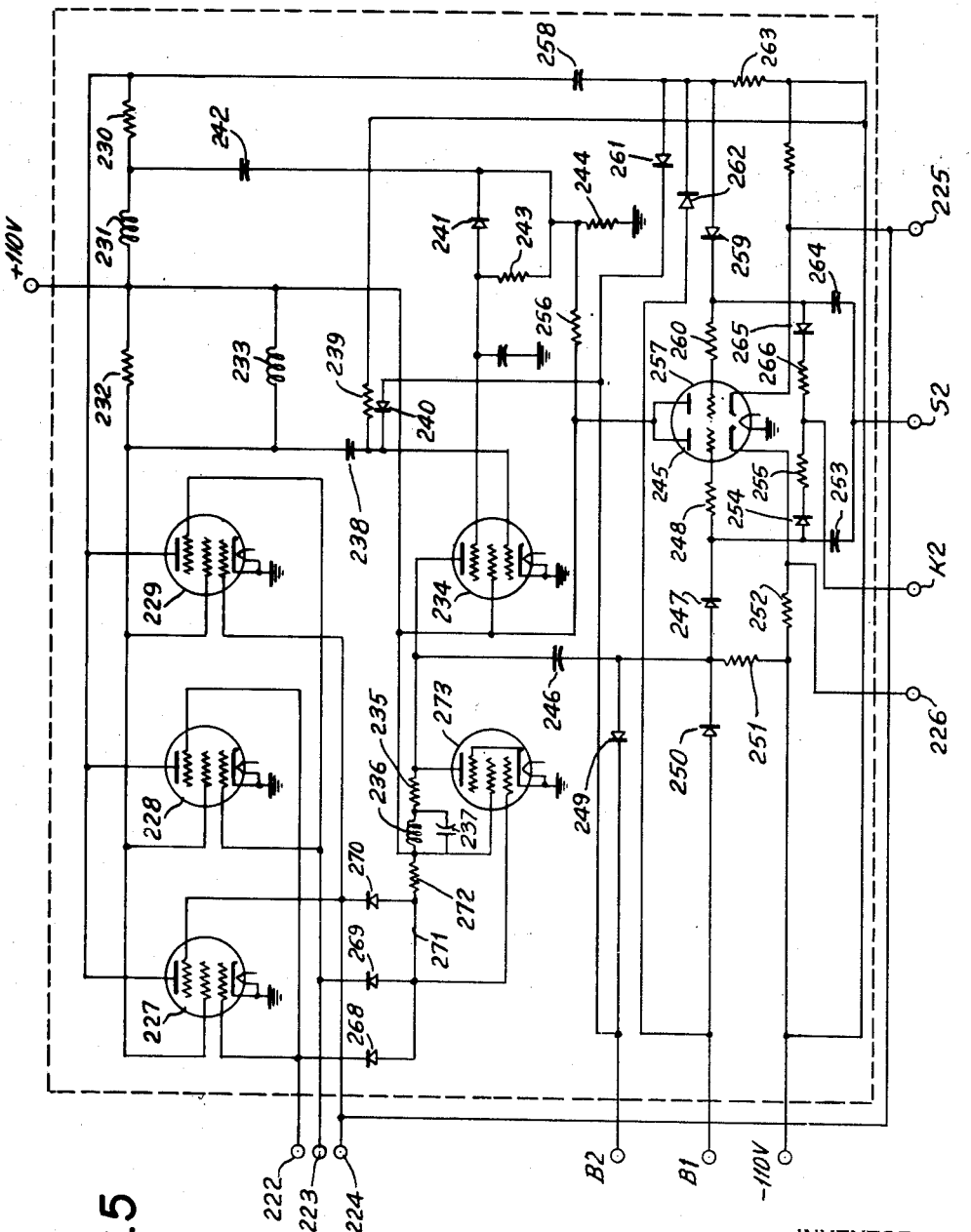
Fig. 5 is a detailed circuit diagram of an individual adding box as incorporated in Figs. 2h and 2j.

Before further discussion of the operation of the chain of adding boxes, it seems desirable to consider the details of a single adding box which are shown separately in Fig. 5. The adding box is provided with three input terminals 222, 223 and 224 and two output terminals 225 and 226, one of the latter being a carry output terminal 225 which is connected externally to the third input terminal 224. The first input terminal 222 is to be connected to the corresponding coincidence circuit through one of lines 221ab(1-8) in Figs. 2h and 2j. The second input terminal 223 is to be connected to the output terminal 226 of the preceding adding box in the chain. The output terminal 226 in Fig. 5 is to deliver the sum of the two numbers added.

Inasmuch as the two binary numbers to be supplied to an adding box as in Fig. 5 are in time coded impulse form, it is evident that only one digit of each number can be supplied to the adding box at any instant. Addition is then performed in a column-by-column manner and, according to the code, successive columns are one microsecond apart in time. There is also incorporated in the adding box a delay of exactly one microsecond between the input and the output terminals. This delay causes a carry output impulse, resulting from the addition of one column, to appear at the carry output terminal 225, and therefore at the third input terminal 224, at exactly the same time as the input impulse representations of the next column appear at the first and second input terminals 222 and 223. In addition, the one microsecond delay between the input and the other output terminal 226 causes, in effect, a column shift of one column of the sum. This is necessary for adding that sum to the next partial product in the next adding box in the chain.

The operation of the adding box is based on the fact that in adding two binary numbers manifested in time coded impulses together, column by column, only four possible conditions can be encountered by the adding box, viz: (1) no input impulses, (2) a single input impulse, (3) two simultaneous input impulses, and (4) three simultaneous input impulses. The manner in which the first condition might arise is, of course, obvious. The second condition may arise upon the adding box receiving a single impulse representing a binary 1 in the column being added in one of the two numbers being added, or an impulse representing a binary 1 carry over from the addition of the previous column. The third condition may arise upon the adding box receiving simultaneously a single input impulse representing a binary 1 in the column being added in one of the two numbers being added, and another impulse representing either a binary 1 in the column being added of the other number or a binary 1 carry. The fourth condition may arise upon the adding box receiving simultaneously two impulses representing a binary 1 in both of the numbers being added and a third impulse representing a binary 1 carry.

The three input terminals 222, 223 and 224 of the adding box in Fig. 5 feed three coincidence tubes 227, 228 and 229, which are preferably pentodes, such as Western Electric 6AS6 tubes. The anodes of the three coincidence tubes 227, 228 and 229 are connected through a resistor 230 and an inductor 231 to the +110 volts supply line, while the cathodes are grounded. The screen grids of the three coincidence tubes are connected together and through a resistor 232 and an inductor 233 in parallel therewith to the +110 volts supply line. The suppressor and control grids of the three coincidence tubes are interconnected in a symmetrical pattern with the three input terminals 222, 223 and 224. The first input terminal 222 is connected to the control grid of the first tube 227 and the suppressor grid of the second tube 228. The second input terminal 223 is connected to the control grid of the second tube 228 and the suppressor grid of the third tube 229. The third input terminal 224 is connected to the suppressor grid of the first tube 227 and the control grid of the third tube 229. Normally, these grids are biased by the voltage levels of the input feeds so that the three tubes 227, 228 and 229 are completely cut off when there are no impulses on any of the input terminals 222, 223 and 224. The arrangement is such that a positive impulse appearing only on the control grid of a coincidence tube causes a high screen grid current and results in a negative voltage impulse at the screen grid. A positive impulse only on the suppressor grid of a coincidence tube does not affect that tube at all. A positive impulse appearing simultaneously on both the control grid and the suppressor grid of a coincidence tube results in a negative voltage impulse at the anode as well as a negative voltage impulse at the screen grid. When negative voltage impulses appear at both the anode and the screen grid of one of the coincidence tubes, the reduction in the magnitude of the screen grid impulse which tends to result from the simultaneous presence of the anode pulse is offset by the fact that more than one of the coincidence tubes 227, 228 and 229 is, under these conditions, providing a screen grid impulse.

The screen grid circuit for the three coincidence tubes 227, 228 and 229 drives the control grid of another pentode 234, such as a Western Electric 6AS6 tube, through an impulse inverter circuit. The anode of the pentode 234 is connected through a resistor 235 and an inductor 236 to the +110 volts supply line. The cathode of the pentode 234 is grounded and the screen grid is connected to the +110 volts supply line. The control grid of the pentode 234 is coupled through a condenser 238 to the screen grids of the three coincidence tubes 227, 228 and 229. The control grid of the pentode 234 is also connected through a resistor 239 to the −110 volts supply line and through a diode 240, preferably a germanium crystal diode, to the biasing voltage line B2, with the diode offering its lower impedance to current flow from the biasing line B2. This arrangement is such that the rest voltage of the control grid of the pentode 234 is that of biasing line B2 which is sufficiently negative to maintain the pentode below cut off.

When a negative voltage impulse appears at the screen grid of one or more of the three coincidence tubes 227, 228 and 229, the coupling condenser 238, which had previously been charged to the voltage difference between the +110 volts and the B2 biasing line, loses charge because the terminal thereof which is connected to the control grid of the pentode 234 is prevented by the arrangement of diode 240 from going more negative than the voltage of biasing line B2. However, as the negative voltage impulse on the screen grid of a coincidence tube is terminated, the voltage thereof rises and because of the condenser coupling a positive impulse is passed through to the control grid of the pentode 234. The upper limit of the positive voltage on the control grid of the pentode 234 under these conditions is determined by the flow of grid current through the pentode 234 when the grid reaches approximately the voltage of the cathode. Following the positive impulse, the control grid of the pentode 234 is caused to return to its rest voltage by the combination of an overshoot of the screen grid circuit, and the action of the resistor 239 connected to the −110 volts supply line, which tends to lower the grid voltage to at least the level of biasing line B2.

The suppressor grid of the pentode 234 is connected through another diode 241, also preferably a germanium crystal diode, and a condenser 242 to the junction point between the inductor 231 and the resistor 230 in the anode circuit for the three coincidence tubes 227, 228 and 229. A resistor 243 is connected in parallel with the diode 241 which offers its lower impedance to current flow from the suppressor grid. The junction between the diode 241 and the condenser 242 is connected to a junction between a resistor 256 and another resistor 244 which are in series from the +110 volts line to the ground. Thus, the suppressor grid is normally held at a voltage slightly more positive than the cathode.

If the suppressor grid of the pentode 234 is at, or more positive than, the voltage of the cathode, the presence of a positive voltage impulse at the control grid of the pentode 234 resulting from the termination of a negative voltage impulse at the screen grids of the coincidence tubes 227, 228 and 229, causes the pentode 234 to become conductive and a negative voltage impulse to appear at its anode.

The anode of the pentode 234 in Fig. 5 is coupled through a pulse inverter and synchronous delay circuit to the grid of a triode 245 connected in a cathode follower circuit. This pulse inverting and synchronous delay circuit is exactly like the one shown and described in connection with each stage of the electronic commutator in Figs. 2e and 2f with the exception that the resistor for eliminating parasitic oscillations is placed in the grid circuit instead of in the anode circuit of the triode 245. Preferably the triode 245 is one-half of a twin triode, such as a Western Electric 2C51 tube. The operation of the pulse inverting and delay circuit in Fig. 5 is substantially the same as that in Figs. 2e and 2f.

In the pulse inverting and synchronous delay circuit of Fig. 5, the anode of the pentode 234 is connected through a coupling condenser 246, a first diode 247, and a resistor 248 to the grid of the triode 245. The first diode 247 offers its lower impedance to current flow toward the grid. The terminal of the coupling condenser 246 remote from the anode of the pentode 234 is connected through a second diode 249 to the biasing voltage line B2 with the diode 249 offering its lower impedance to current flow toward the biasing line B2. The same terminal of the coupling condenser 246 is connected through a third diode 250 to the biasing voltage line B1 with the third diode 250 offering its lower impedance to current flow away from the biasing line B1. The same terminal of the coupling condenser 246 is also connected through a resistor 251 to the −110 volts supply line, the latter also being connected through a load resistor 252 to the cathode of the triode 245. The junction point between the first diode 247 and the resistor 248 is connected through a coupling condenser 253 to a synchronous voltage impulse line S2. The same junction point is also connected through a fourth diode 254 and a resistor 255 to a clamp voltage impulse line K2. The output terminal 226 for the adding box is connected to the cathode of the triode 245 while the anode thereof is connected to the +110 volts supply line. The first, second, third and fourth diodes 247, 249, 250 and 254 are all preferably germanium crystal diodes.

A voltage impulse is supplied to the adding box over the synchronous impulse line S2 once each microsecond from the synchronizer, as explained hereinafter. This pulse is similar in magnitude, shape, and duration to the synchronous impulse supplied to the commutator on line S1. A negative voltage impulse is supplied to the adding box over the clamp impulse line K2 from the synchronizer once each micro-second as explained hereinafter, and coincides with the termination of the synchronous impulse on line S2. The clamp impulse on line K2 is substantially the same in magnitude, time, shape and duration as the clamp impulse on line K1 previously described.

Let it be assumed that the grid of triode 245 is at the potential of line B1 with condenser 253 charged to the difference between line B1 and the normal voltage of synchronous line S2. Because of the connection of the −110 volts line through the resistor 251 to the junction between the coupling condenser 246 and the first diode 247, that junction tends to be highly negative but is limited to the voltage of biasing line B1 by the third diode 250. The grid of triode 245 is also prevented from becoming more negative than biasing line B1 by the third and first diodes 250 and 247. Now when a negative voltage impulse appears at the anode of the pentode 234, the coupling condenser 246 which has been previously charged to the voltage difference between the +110 volts and the biasing line B1, is discharged. However, during this discharge the terminal of the condenser 246 remote from the anode of the pentode 234 is maintained substantially at the voltage of line B2 because of its connection thereto through the third diode 250. As the negative anode impulse at the pentode 234 ends, a positive impulse is passed through the coupling condenser 246 and the first diode 247 to the grid of the triode 245 and to condenser 253. The magnitude of this positive impulse is limited by the arrangement of the second diode 249, to the difference between the voltages of biasing lines B1 and B2. This positive impulse changes the charge on the condenser 253 coupling the grid of the triode 245 to the synchronous impulse line S2, so that even after the positive impulse is terminated, the grid remains at the voltage of biasing line B2.

The purpose of the first diode 247 is to permit the voltage of the terminal of the coupling condenser 246 remote from the anode of the pentode 234 to return to the voltage level of line B1 without changing the voltage of the grid of the triode 245. Such return of the voltage of the condenser terminal is effected by an overshoot of the anode impulse of the pentode 234 and the action of the resistor 251 connecting the terminal to the −110 volts supply line.

It is then evident that while the pentode 234 remains non-conductive, the grid of triode 245 remains at the negative voltage level of biasing line B1. While the grid is at this level, the application of a synchronous impulse thereto does not produce a sufficient impulse output of the triode 245 to actuate any of the tubes to be supplied therefrom. On the other hand, when the pentode 234 becomes conductive and then non-conductive, a voltage pedestal of the level of line B2 is established on the grid of the triode 245. With the grid at the level of line B2, a synchronous impulse produces an effective impulse at the triode output. Since the pentode 234 becomes conductive as a result of the coincidence tube or tubes becoming non-conductive following receipt of an impulse, and the voltage pedestal at the grid of triode 245 is established as a result of the pentode 234 becoming non-conductive, it is apparent that the synchronous impulse producing the output impulse is that synchronous impulse which occurs at the next time period after the time period in which the input impulse to the adding box originally occurred. Thus, the output impulse occurs one microsecond after the input impulse.

As the synchronous impulse ends, the negative clamping impulse having a steep wave front is supplied over line K2 causing the grid of the triode 245 to be lowered to the voltage level of line B1. The fourth diode 254 and the resistor 255 in series therewith serve to isolate the clamping supply line K2. The constants of the load circuit of the pentode 234 are selected to provide the desired shape for the voltage pedestal.

It now appears that when a negative voltage impulse appears at the screen grids of the three coincidence tubes 227, 228 and 229 and the suppressor grid of the pentode 234 remains at or above the voltage of its cathode, a positive voltage impulse is delivered to the output terminal 226 of the adding box exactly one microsecond after the input impulses which caused the screen grid impulse.

While the suppressor grid of the pentode 234 is normally slightly positive with respect to its cathode, the presence of a negative impulse at the anodes of the three coincidence tubes 227, 228 and 229 causes the suppressor grid to become more negative. As previously mentioned, such a negative anode impulse at the three coincidence tubes results from the presence of two or more simultaneous impulses on the three input terminals. This negative impulse at the anodes of the coincidence tubes is transmitted to the suppressor grid of the pentode 234 through the coupling condenser 242 and the diode 241. When the suppressor grid of pentode 234 is negative, it prevents the anode of pentode 234 from becoming conductive in response to a positive impulse on the control grid.

It is to be noted that the negative impulse on the suppressor grid of pentode 234 is obtained from the inductive portion, i. e., inductor 231, of the load of the three coincidence tubes. This arrangement is used to prevent undesirable changes in the average voltage of the suppressor grid which would result if condenser 242 were connected directly to the anodes of the coincidence tubes. The positive impulses on the control grid of the pentode 234 resulting from a negative impulse at the screen grids of the coincidence tubes is delayed somewhat since the positive impulse is the result of the termination rather than the initiation of the negative screen grid impulse at the coincidence tubes. However, by having the negative impulse on the suppressor grid of the pentode 234 supplied directly by the anode circuit of the coincidence tubes and by having the voltage of the suppressor grid returned to its rest or normal value more slowly than the lower terminal of the coupling condenser 242 because of the arrangement of the diode 241 and resistor 243, the suppressor grid is maintained negative over a sufficient interval to insure blocking of the pentode 234 even though a positive impulse is supplied to the control grid. Thus, it is evident that when two or more impulses occur simultaneously on the input terminals 222, 223 and 224, the anode of pentode 234 is maintained non-conductive.

In adding a single column of two numbers in the binary system, a binary 1 plus a binary 0, represented by a single impulse on one of the input terminals 222, 223 and 224 of an adding box as in Fig. 5, equals a binary 1, represented by a single impulse produced at the output terminal 226 as a result of the screen grid impulse at the coincidence tubes 227, 228 and 229 and the operation of the pentode 234 and triode 245 as previously described. However, a binary 1 plus another binary 1, as represented by two simultaneous impulses on two of the input terminals 227, 228 and 229, equals a binary 0 with a binary 1 being carried over to the next column. Consequently, there should not be an impulse on the output terminal 226 in this last example, but a carry impulse must be provided. Now when two or more input impulses occur simultaneously, there is produced a negative impulse at the anodes of the coincidence tubes 227, 228 and 229, as well as at their screen grids. The anode impulse is effective as just described to block the tendency of the screen grid impulse to produce an output impulse at the output terminal 226 to represent a binary 1 and the absence of an impulse at the output terminal 226 then represents a binary 0. This same anode impulse is also employed to produce the necessary carry impulse at the carry terminal 225.

The anodes of the three coincidence tubes 227, 228 and 229 in Fig. 5 are coupled to the grid of another triode 257 through another pulse inverting and synchronous delay circuit similar to that described between the pentode 234 and the other triode 245. This pulse inverting and delay circuit comprises a condenser 258, a first diode 259, and a resistor 260 connected in series between the anodes of the coincidence tubes 227, 228 and 229 and the grid of the triode 257. There are also included a second diode 261 connecting the terminal of the condenser 258 remote from the anodes of the coincidence tubes to the biasing voltage line B2, a third diode 262 coupling the same terminal to the biasing line B1, a resistor 263 connecting the same terminal to the —110 volts supply line, a condenser 264 coupling the grid of the triode 257 to the synchronous impulse line S2 and a fourth diode 265 and a resistor 266 connecting the grid to the clamp impulse line K2. The triode 257 may be half of a twin triode of which the triode 245 is the other half. The anode of the triode 257 is connected to the +110 volts supply line. The cathode of the triode 257 is connected through a load resistor 267 to the —110 volts supply line, and is also connected to the carry output terminal 225.

The operation of this pulse inverting and synchronous delay circuit feeding the triode 257 is exactly like that of the delay circuit feeding the triode 245, as previously described. Therefore, when a negative impulse appears at the anodes of the coincidence tubes, a positive impulse appears exactly one microsecond later at the carry output terminal 225 which is connected directly to the third input terminal 224.

It now appears that when two input impulses occur simultaneously on two of the input terminals producing a negative impulse at both the screen grids and the anodes of the coincidence tubes, an impulse is not provided at the output terminal 226 but an impulse is provided at the carry terminal 225, one microsecond later.

When an impulse occurs simultaneously on each of the three input terminals 222, 223 and 224 of the adding box in Fig. 5, an impulse should be produced for proper addition on both the output terminal 226 and the carry terminal 225 inasmuch as a binary 1 plus a second binary 1 plus a third binary 1 equals a binary 1 with a carry of a binary 1 to the next column. It has already been pointed out that simultaneous impulses on the three input terminals causes a negative impulse at the screen grids and at the anodes of the coincidence tubes 227, 228 and 229. This produces an impulse at the carry output terminal 225 one microsecond later but the tendency of the screen grid impulse to produce an output impulse at the output terminal 226 through the pentode 234 is blocked. To provide such an output impulse under these conditions, a novel triple coincidence circuit is provided.

The triple coincidence circuit incorporates three diodes 268, 269 and 270, preferably germanium crystal diodes, connected, respectively, between the three input terminals 222, 223 and 224 and a common line 271 with the diodes offering their lower impedance to current flow toward the input terminals. The common line 271 of the three diodes 268, 269 and 270 is connected through a resistor 272 to the +110 volts supply line. It is also connected to the control grid of another pentode 273, such as a Western Electric 6AK5 tube. The anode of the second pentode 273 is connected to the anode of the first pentode 234 and therefore is connected through the resistor 235 and the parallel connected condenser 237 and inductor 236 to the +110 volts supply line, as well as to the grid of the triode 245 through the pulse inverting and synchronous delay circuit therebetween. The cathode of the second pentode 273 is connected to the ground and to the suppressor grid and the screen grid is connected to the +110 volts supply line.

By the arrangement described, the common line 271 of the three diodes 268, 269 and 270 can be but very little more positive than the voltage of the most negative of the input terminals 222, 223 and 224. In other words, for the common line 271 to have a positive impulse, it is necessary that all three input terminals 222, 223 and 224 have a positive impulse thereon at the same time. When this occurs, the second pentode 273 becomes conductive and passes an impulse to the triode 245 to produce in turn an impulse at the output terminal 226 one microsecond after the input impulses. It is then obvious that when input impulses are applied simultaneously to the three input terminals, the second pentode 273 acts on the first triode 245 to produce an output impulse at terminal 226 while the anode impulse of the coincidence tubes 227, 228 and 229 produces a carry impulse at terminal 225 and blocks the first pentode 234 which is responsive to screen grid impulse of the coincidence tubes.

From the foregoing description of an adding box as shown in Fig. 5, it is evident that a single input impulse produces a single output impulse at terminal 226; two simultaneous input impulses produce only a carry impulse; and three simultaneous input impulses produce an output impulse at terminal 226 and a carry impulse. The output and carry impulses are delayed exactly one microsecond in all cases which is to be remembered in interpreting the time coded impulses representing the sum of the numbers added by the adding box.

As mentioned hereinbefore, an adding box

AB(1-8) is provided for each of the eight coincidence circuits 190b(1-8) in Figs. 2h and 2j. These adding boxes AB(1-8) are connected in a chain in reverse order with the output terminal 226 of each adding box except the last in the chain being connected to the second input terminal 223 of the succeeding adding box in the chain. Thus, the eighth adding box AB8, corresponding to the eighth coincidence circuit 190b8, has its output terminal 226 connected to the second input terminal 223 of the seventh adding box AB7, corresponding to the seventh coincidence circuit 190b7. Similarly, the output of the seventh adding box is connected to the input of the sixth adding box, the sixth to the fifth, the fifth to the fourth, the fourth to the third, the third to the second, and the second to the first. The output of the first adding box provides the sum of all the partial products on lines 221ab(1-8). The second input terminal of the eighth adding box is not employed. Accordingly, the eighth adding box may be replaced, if desired, by a simple one microsecond delay circuit. The carry output terminal 225 of each adding box is connected to the third input terminal 224 of the same adding box while the first input terminal 222 thereof is connected to the output line 221ab(1-8) of the corresponding coincidence circuit 190b(1-8).

To obtain the total product of the multiplier and multiplicand from the partial products of all of the multiplicand digits and the individual digits of the multiplier as carried on the output lines 221ab(1-8), it is necessary, in accordance with standard arithmetical practice, to add the partial products but with a columnar displacement or shift between successive partial products. Thus, in adding the partial products together, the partial product of the second digit of the multiplier and all of the digits of the multiplicand is shifted one column, i. e., one digital position, to the left with respect to the partial product of the first multiplier digit and the multiplicand; the partial product of the third multiplier digit and the multiplicand is shifted two columns to the left; and so on through the partial product of the eighth multiplier digit and the multiplicand which is shifted seven columns to the left.

It is to provide the proper columnar displacement that the adding boxes AB(1-8) are connected in a chain as described. With this arrangement, the partial product of the eitghth multiplier digit and the multiplicand on line 221ab8 is supplied to the eighth adding box AB8 and passes therethrough with a one microsecond delay. This output is thus, in effect, column shifted and is fed to the seventh adding box AB7 for addition to the partial product of the seventh multiplier digit and the multiplicand as carried on line 221ab7. These two partial products are added by the seventh adding box with due respect to their columnar positions and the result is delayed one more microsecond for a second column shift before being supplied to the sixth adding box AB6 wherein it is added to the partial product of the sixth multiplier digit and the multiplicand. This procedure is followed down the chain until the partial products of the multiplicand and each of the second through the eighth multiplier digits are added. This result is added to the partial product of the first digit of the multiplier and the multiplicand in the first adding box AB1. It is to be noted that the first adding box AB1 further delays by one microsecond the time coded impulses representing the sum of all the partial products. This displacement as well as the one microsecond delay preceding the coincidence circuits is taken care of in the product translator which translates the sum of all of the partial products into a selective energization of a plurality of lines.

The output terminal 226 of the first adding box AB1 in Fig. 2j is connected through individual resistors 274 and 275 to the grids of a pair of triodes 276 and 277, preferably arranged in a single envelope, as in an RCA 12AU7 tube, connected in a cathode follower circuit. The anodes of the triodes 276 and 277 are connected together to the +110 volts supply line while the cathodes are connected together through a pair of resistors 278 and 279 in parallel, to the −110 volts supply line. The output of the cathode follower circuit is taken from the cathodes of the triodes 276 and 277 and applied to a coaxial line 280 for transmission to the product translator. In this manner, a low impedance supply for the coaxial line 280 is provided.

*Synchronizer for coincidence circuits and adding boxes*

That portion of the synchonizer which is shown in Fig. 2i is for supplying synchonous and clamping impulses to the time delay circuit input for the coincidence circuits and to the adding boxes over supply line S2, K2 and K3.

As previously set forth in connection with the other portion of the synchronizer shown in Fig. 2g, which is employed to supply impulses to the translator, an alternating voltage having a one megacycle per second frequency is provided on the coaxial line 124. The alternating voltage on this coaxial line 124 is applied in Fig. 2i to the grid circuits of a pair of triodes 281 and 282, which are preferably enclosed in a single envelope such as a Western Electric 2C51 tube. The triodes 281 and 282 are connected in individual cathode follower circuits with their anodes connected together to the +110 volts supply line. The cathode of triode 281 is connected through a parallel circuit comprising a condenser 283 on one side and a resistor 284 on the other side and then another parallel circuit comprising a condenser 285 on one side and an inductor 286 on the other side and then through a resistor 287 to the −110 volts supply line. The cathode of the triode 282 is connected through a parallel circuit comprising a condenser 288 on one side and a resistor 289 on the other side, and then another parallel circuit comprising a condenser 290 on one side and an inductor 291 on the other side, and then through the resistor 287 to the −110 volts supply line. The inductor 286 and its associated condenser 285 are arranged in a resonant circuit as are the condenser 290 and the inductor 291, both resonant circuits having a resonant frequency of one megacycle per second. This arrangement in cathode follower circuits provides a more efficient utilization of the available voltage than in the usual cathode follower circuit.

The grid of triode 281 is connected through a resistor 292 to an intermediate tap on another resistor 293. The latter resistor 293 is connected in series with a condenser 294, an inductor 295, and the resistor 287 between the terminal of the coaxial line 124 and the −110 volts supply line. It is then apparent that the one megacycle alternating voltage of coaxial line 124 is applied to the grid of triode 281 with the arrangement of the condenser 294, resistor 293, and inductor 295 in the grid circuit permitting an adjustment of the phase of the grid voltage of the triode 281 for a purpose to be described hereinafter.

The alternating voltage output appearing at the cathode of tube 281 is fed to a pentode 296, preferably a Western Electric 6AK5 tube. The anode of the pentode 296 is connected through a pair of resistors 297 and 298 in series to the +110 volts supply line and is also connected to ground through another resistor 237. The cathode of the pentode 296 is connected through another pair of resistors 299 and 300 in series to the −110 volts supply line. The suppressor grid of pentode 296 is connected to the cathode and the screen grid is grounded. The control grid is connected through a coupling condenser 301 to the cathode of the triode 281. The control grid of the pentode 296 is also connected through a resistor 302 to the junction between the resistors 299 and 300 in the cathode circuit. Then as a result of the A. C. coupling furnished by the coupling condenser 301 and the restoring resistor 302, the input of the pentode 296 is grid current biased. The resistor 299 in the cathode circuit of the pentode 296 is of a value providing a sufficient biasing action to protect the pentode, as well as a pair of tubes 303 and 304 fed thereby, from damage in the event of failure of excitation from the triode 281. The circuit arrangement for the pentode 296 is such that a negative voltage impulse appears at the anode once each cycle of the one megacycle alternating voltage, or, in other words, once each microsecond.

The negative pulse which appears in the anode circuit of pentode 296 once each microsecond is transferred to a pair of parallel operated tubes 303 and 304 which are preferably pentodes such as RCA 50B5 tubes. The anode of pentode 296 is connected through individual grid resistors 305 and 306 to the control grids of the tubes 303 and 304. The cathodes of these tubes are connected together and grounded while the anodes are connected through parallel resistor networks 307 and 308 to the +110 volts supply line. The suppressor grids of tubes 303 and 304 are grounded while the screen grids are connected through individual resistors 309 and 310, respectively, to an adjustable tap 311 on a voltage divider 312 connected between the +110 volts supply line and the ground.

The tubes 303 and 304 are biased by the circuits just described so that they are normally conductive with their control grids sufficiently positive that grid current flows. When a negative voltage impulse appears in the anode circuit of the pentode 296, the control grids of tubes 303 and 304 are driven below cut-off so that these tubes become non-conductive. Consequently, a positive voltage impulse appears in the anode circuit of tubes 303 and 304 once each microsecond. Since the control grids of these tubes are either sufficiently positive for grid conduction (the normal condition) or below cut-off (during an impulse at the anode of pentode 296), the positive impulses in the anode circuit have a substantially square wave form. The constants are arranged so that the positive impulses in the anode circuits of tubes 303 and 304 are approximately one-third of a microsecond wide with approximately two-thirds of a microsecond between two successive positive impulses. The tubes 303 and 304 are connected in parallel to provide sufficient voltage with a low output impedance to prevent interaction among the various circuits driven by the output impulses. These output impulses in the anode circuits of tubes 303 and 304 are applied to the synchronous impulse supply line S2 by connecting that line to the resistor networks 307 and 308.

The triode 282 in Fig. 2i is also fed with an alternating voltage from the coaxial line 124. The grid of triode 282 is connected through a resistor 313 to a point intermediate a condenser 314 and a resistor 315 which are connected in series with the resistor 287 between the coaxial line 124 and the −110 volts supply line. Accordingly, an alternating voltage having a frequency of one megacycle per second appears at the cathode of triode 282. This alternating voltage is supplied to a pair of tubes 316 and 317 which are preferably pentodes, such as RCA 50B5 tubes, and are arranged to produce clamping impulses to be applied to supply lines K2 and K3.

The anodes of tubes 316 and 317 are connected through individual resistors 318 and 319, respectively, to the +110 volts supply line. The anodes are also connected through individual resistors 325 and 326, respectively, to the ground. The cathodes of the tubes 316 and 317 are connected together and through another resistor 320 to the −110 volts supply line and through a by-pass condenser 320.1 to ground. The suppressor grids of tubes 316 and 317 are connected to their respective cathodes and the screen grids are grounded. The control grids are connected through individual coupling condensers 321 and 322 to the cathode of the triode 282. The control grids of tubes 316 and 317 are also connected through individual resistors 323 and 324, respectively, to the −110 volts supply line.

It is evident that tubes 316 and 317 are connected in similar parallel circuits having similar components. Both tubes receive an alternating voltage input from the triode 282 and their functions are identical. The time constants provided by condenser 322 and resistor 324 and by condenser 321 and resistor 323 are such that only the peak of the alternating voltage wave input causes the tubes 316 and 317 to become conductive. Consequently, a negative voltage impulse having a steep wave front appears at the anode of each of the tubes 316 and 317 once each microsecond at the peak of the alternating voltage supply. By adjustment of the phase shifting circuit including condenser 294, resistor 293, and inductor 295, the negative impulses at the anode of tubes 316 and 317 occur at the termination of the synchronous impulses on line S2. The negative impulses at the anode of tubes 316 and 317 are applied to clamping impulse lines K2 and K3, respectively, for application to the adding boxes and the time delay circuit preceding the coincidence circuits.

*Product translator*

The function of the product translator in Figs. 2e, 2f and 2h is to receive the time coded impulses representing the product of the multiplier and multiplicand, as provided by the adding box chain on coaxial line 280, and to selectively energize a plurality of circuits to represent that product. In performing this function sixteen product translator stages 327c(1–16) are provided and shown at the right half of Figs. 2e and 2f representing the sixteen digital positions available for the product. These product translator stages 427c(1–16) are fed from a common product bus P energized from the coaxial line 280 through a wave shaper and inverter. In addition, the product translator stages 327c(1-16) are individually connected to the outputs of corresponding stages of the electronic commutator 65-80 previously described in connection with the multiplicand translator.

As shown in Fig. 2h, the coaxial line 288, carrying the time coded positive voltage impulses representing the product, is connected to the control grid of a vacuum tube 328, preferably a pentode such as a Western Electric 6AK5 tube. The anode of tube 328 is connected through a resistor 329 and an inductor 330 in series to the +110 volts supply line. The suppressor grid of the tube 328 is connected to the cathode which is grounded. The screen grid is connected to the +110 volts supply line and the control grid is also connected through a resistor 331 to the −110 volts supply line.

The anode of tube 328 is connected through a coupling condenser 332 and a first diode 333, preferably a germanium crystal diode, in series therewith to the grid of a triode 334 shown as one-half of a twin triode tube, such as a Western Electric 2C51 tube. The diode 333 is arranged to offer its lower impedance to current flow toward the grid. The anode of the triode 334 is connected through a resistor 335 to ground and the cathode is connected through a resistor 336 and a small decoupling resistor 337 in series therewith to the −110 volts supply line. The cathode is also connected through another resistor 338 to ground. The junction between the resistors 336 and 337 is connected through a resistor 339 and another resistor 340 in series therewith to the ground. The same junction is connected to the ground through a condenser 341 and is also connected by a second diode 342, also preferably a germanium crystal diode, to the junction between the first diode 333 and the coupling condenser 332, with the second diode offering its lower impedance to current flow away from the junction between resistors 336 and 337. The control grid of the triode 334 is connected through a condenser 343 to the ground and through a third diode 344, also preferably a germanium crystal diode, and a resistor 345 and condenser 346 in series to the clamping impulse supply line K1. The third diode 344 is arranged to offer its lower impedance to current flow from the grid of the triode 334. A fourth diode 437, also preferably a germanium crystal diode, is connected from the junction of resistor 345 and condenser 346 to the junction of resistors 340 and 339. Another resistor 348 having a relatively high resistance is connected in parallel with the fourth diode 347, the lower impedance of the latter being offered to current flow away from the junction of resistor 345 and condenser 346.

The purpose of the circuit just described, incorporating tubes 328 and 334 and the four diodes 333, 342, 344 and 347, is to receive the time coded positive voltage impulses representing the product and to reshape, invert, change the voltage level thereof and delay them by one microsecond. The tube 328 is normally below cut-off as determined by the output of first adding box AB1 and the cathode follower circuit incorporating tube 277. When a positive voltage impulse representing a binary 1 is impressed on the control grid of tube 328 from the coaxial line 288, the tube 328 becomes conductive. As tube 328 becomes conductive, the coupling condenser 332, which had previously been charged to the voltage difference between the +110 volts supply line and the voltage at the junction between resistors 336 and 337, is discharged without substantial effect on the grid of the triode 334 because of the arrangement of the second diode 342. As the tube 328 again becomes non-conductive at the end of an impulse on its control grid, a positive voltage impulse is transferred through condenser 332 and diode 333 to the grid of the triode 334 and to condenser 343. This impulse lasts until a subsequent clamp impulse from line K1 restores the grid of triode 334 to the potential of the junction between resistors 336 and 337. Because the voltage level of the clamp line K1 is unsuitable for clamping the circuits associated with triode 334, the clamp line K1 is A. C. coupled through condenser 346 and D. C. restored through diode 347 to the potential of the junction between resistors 340 and 339. The clamp impulse operates through the coupling condenser 346 and resistor 345 and diode 344 to restore the grid of the triode 334 to the potential of the junction between resistors 336 and 337.

The resistor 338 in Fig. 2h is considerably larger than the resistor 336. The cathode of the triode 334 is connected to the junction between resistors 338 and 336 to bias the triode well below cut-off.

As a result of positive transmitted signal impulse, representing a binary 1, appearing at the control grid of pentode 328, there is a positive voltage pedestal established at the grid of triode 334. Since this pedestal is established by reason of the pentode becoming non-conductive, it is not established until the termination of the transmitted signal impulse which caused it to be established. Therefore, the pedestal exists during the time of the signal impulse associated with the next microsecond period. This pedestal is of a value causing the triode 334 to conduct and consequently produce a negative voltage impulse at the anode of the triode of the same duration as the pedestal. The product bus P is connected to the anode of the triode 334 and so receives the negative impulses representing the product to deliver them to the product translator stages 327c(1-16).

Each stage 327c(1-16) of the product translator in Figs. 2e and 2f includes a pentode coincidence tube 349, such as a Western Electric 6AS6 tube, a thermionic diode 350, such as half of an RCA 6AL5 tube, and another pentode 351, such as an RCA 50B5 tube. Each coincidence tube 349 has its anode connected through a resistor 352 to the +110 volts supply line while the cathode is grounded and the screen grid is connected to the +110 volts supply line. The suppressor grid of each coincidence tube 349 is connected to the product bus P and the control grid is connected to the cathode of the triode 83 of a corresponding stage of the electronic commutator described in connection with the multiplicand translator.

As previously explained, the electronic commutator provides a positive output voltage impulse from each of its sixteen stages in succession at the rate of one microsecond per stage following a starting impulse. This output impulse appears at the cathode of the triode 83 in each commutator stage, which cathode is connected to the control grid of the coincidence tube 349 of the corresponding product translator stage. Now while the first commutator stage 65 provides an impulse for the first digit of the multiplicand, the impulse for the first digit of the product, because of the time delays in the intervening circuits, occurs at the same time as the impulse provided by the fourth commutator stage 68. Consequently, the first product translator stage 327c1 does not correspond to the first commutator stage 65 but instead corresponds to the fourth commutator stage 68; the second through the thirteenth product translator stages 327c(2-13) correspond respectively to the fifth through the sixteenth commutator stages 69-80; and the fourteenth through the sixteenth product translator stages 327c(14-16) correspond, respectively, to the first three commutator stages 66-67. This arrangement compensates for the time delays encountered between the multiplicand translator and the product translator which adds up to three microsecond periods. Consequently, a binary 1 in the first digital position of the product is represented on the product bus P by a negative voltage impulse which occurs during the positive output voltage impulse from the fourth commutator stage 68; an impulse representing a binary 1 in the second digital position occurs during the output of the fifth commutator stage 69; and so on to an impulse representing a binary 1 in the sixteenth digital position of the product which occurs during the output of the third commutator stage. The impulses on the product bus P are to be compared as to time of occurrence with the commutator impulses and whenever a product impulse and a commutator impulse occur simultaneously at a given stage of the product translator, that stage tends to cause operation, as hereinafter described, of either the corresponding punch in the recorder or the corresponding indicator light in the indicator, as the case may be.

Since the cathode of the triode 83 of a commutator stage is normally negative at about the potential of line B1, the control grid of the coincidence tube 349 of the corresponding product translator stage is held below cut-off except when a positive impulse is delivered from the commutator. Now the normal voltage of the product bus P is at about ground voltage and a binary 1 in the product is represented by a negative impulse on the product bus. This negative impulse is of sufficient magnitude to lower the voltage of the suppressor grid of the coincidence tube 349 below cut-off. Thus, if a negative impulse on the product bus P coincides with a positive impulse from the commutator on the control grid of the coincidence tube 349, the anode circuit of tube 349 still remains non-conductive. However, if a negative impulse is not present on the product bus when the positive commutator pulse is received, the coincidence tube 349 becomes conductive and a negative pulse appears at the anode thereof. It follows that a negative impulse appears at the anode of each of the sixteen coincidence tubes 349 in succession, once each sixteen microseconds when there are no negative impulses on the product bus P. When time coded negative impulses are present on the product bus P, negative impulses do not appear at the anodes of any coincidence tube at the corresponding time period.

The diode 350, provided for each of the sixteen product translator stages, has its cathode coupled to the anode of the corresponding coincidence tube 349 by a condenser 353. The cathode of each diode 350 is also connected through a resistor 354 to the —110 volts supply line. The anode of the diode 350 is connected by a resistor 355 to the biasing voltage supply line B3 which during operation of the device is only very slightly more positive than the —110 volts supply line so that the diode 350 is only slightly conductive when no negative impulse is present at the anode of the corresponding coincidence tube 349.

The pentode 351, provided for each of the sixteen stages in the product translator, has its anode connected through the corresponding one of a plurality of wires 356c(1-16) to the corresponding one of the plug hubs 50c(1-16) in Fig. 2c which is connected through a corresponding condenser 357c(1-16) to the +110 volts supply line. As set forth in the description of the recorder and the indicator, the plug hubs 50c(1-16) are to be connected through the switches 10c(1-16) to one side of either the corresponding punch magnets 39c(1-16) in Fig. 2a or the corresponding indicator lights 59c(1-16) in Fig. 2b, the other sides of which are connected to the +110 volts supply line. The condensers 357c(1-16) are used to prevent the momentary high voltages which would otherwise be created when the current to the punch magnets is interrupted.

The cathode of pentode 351 is connected to the —110 volts supply line and the control grid is connected directly to the anode of the corresponding diode 350 and through a condenser 358 to ground. The screen grid is connected through a resistor to ground.

It has been noted that while all of the other voltage supply lines are at substantially constant voltages, the supply line B3 is arranged to be at either of two voltages. When the cam operated switches 31 in the record reader of Fig. 2a or the multiplier selector switches 56b(1-16) in Fig. 2b, as the case may be, are open, the voltage of line B3 is more negative than the —110 volts supply line. Under these conditions, the plate of the diode 350, and therefore the control grid of the pentode 351, is appreciably more negative than its cathode so that the pentode 351 is maintained non-conductive. When the cam operated switches 31, or the selector switches 56b(1-16), as the case may be, are closed, the voltage of line B3 rises to a point slightly more positive than the —110 volts supply line tending to make the pentode conductive.

Whenever a negative impulse appears at the cathode of the diode 350 as a result of the anode of the coincidence tube 349 becoming conductive, the voltage of the control grid of the corresponding pentode 351 is lowered by conduction of the diode 350 to cause the pentode 351 to become non-conductive. Such an impulse occurs once each sixteen microseconds except when there is a product impulse on the product bus P coinciding with the commutator impulse. Lowering of the voltage of the control grid of the pentode 351 once each sixteen microseconds is sufficient to maintain the pentode non-conductive because of the time constant of resistor 355 and condenser 358 which is long compared to sixteen microseconds. Consequently, the pentode 351 becomes conductive only with repetition of a binary 1 in the corresponding digital position in the product. When the pentode 351 in any of the product translator stages 327c(1-16) becomes conductive, the corresponding punch magnet 39c(1-16) or product indicator light 59c(1-16), as the case may be, is energized.

In the multiplying device described and shown in the drawings, a multiplication operation takes place in nineteen microseconds. However, as long as a representation of the multiplicand and the multiplier is provided by the record reader or the manual selector, as the case may be, the multiplication operation is repeated once each sixteen microseconds. Since, with the record reader or manual selector as described, the representation is provided over a period permitting several repetitions of the multiplication operation, the product translator circuits are arranged so that a few repetitive operations are required before the control grids of those pentodes 351 corresponding to binary 1's become sufficiently positive to permit current flow through those pentodes of sufficient strength to pick up a punch magnet.

*Operation.—(Example 10111×1101)*

The operation of the multiplying device may be better understood by consideration of a specific problem as, for example, the multiplication of a binary number 10111, designated the multiplicand, and another binary number 1101, designated the multiplier. In accordance with the binary system, the multiplicand 10111 has a value of $$(1\times 2^4)+(0\times 2^3)+(1\times 2^2)+(1\times 2^1)+(1\times 2^0)=23$$

and the multiplier 1101 has a value of $$(1\times 2^3)+(1\times 2^2)+(0\times 2^1)+(1\times 2^0)=13$$

The value of the product must be $$13\times 23=299$$

which is equivalent to the binary number 100101011 having a value of $$(1\times 2^8)+(0\times 2^7)+(0\times 2^6)+(1\times 2^5)+(0\times 2^4)+\\ (1\times 2^3)+(0\times 2^2)+(1\times 2^1)+(1\times 2^0)=299$$

If the record reader of Fig. 2a is to be employed in the multiplying device for this sample problem, the switches 10a(1–12) and 10x in Fig. 2c and switches 10b(1–8) in Fig. 2d are closed in their upper positions. The multiplicand 10111 and the multiplier 1101 are to be represented on a card 11 in Fig. 2a by appropriate perforations therethrough. The perforated or punched card 11 is fed to the record reader and the perforations are sensed by brushes 27a(1–12) and 28b(1–8). It will be remembered that the first brushes of each group 27a1 and 28b1 correspond to the right end digits of the multiplicand and multiplier, respectively. Therefore, as the row of perforations representing the multiplier and multiplicand comes under these brushes, the perforations in the card 11 permit the brushes 27a(1, 2, 3 and 5) and brushes 28b(1, 3 and 4) to engage the contact roller 29. Thus, the lines between brushes 27a(1, 2, 3 and 5) in Fig. 2a and dividers 61a(1, 2, 3 and 5) in Fig. 2c are energized as are the lines connecting brushes 28b(1, 3 and 4) in Fig. 2a and dividers 192b(1, 3 and 4) in Fig. 2d. It is then evident that the lines between the brushes 27a(1–12) in Fig. 2a and the dividers 61a(1–12) in Fig. 2c are selectively energized to represent the multiplicand 10111 and the lines between the multiplier sensing brushes 28b(1–8) in Fig. 2a and the dividers 192b(1–8) in Fig. 2d, are selectively energized to represent the multiplier 1101.

If, on the other hand, the manual selector of Fig. 2b is to be employed in the multiplying device instead of the record reader of Fig. 2a, the switches 10a(1–12) and 10x in Fig. 2c and switches 10b(1–8) in Fig. 2d are closed in their lower positions. The multiplicand selector switches 53a(1–12) in Fig. 2b are then set up to represent the multiplicand 10111 and the multiplier switches 56b(1–8) are set up to represent the multiplier 1101. To accomplish this, multiplicand switches 53a(1, 2, 3 and 5) are closed while the other multiplicand switches remain open, and the multiplier selector switches 56b(1, 3 and 4) are closed while the other multiplier selector switches remain open. In this manner, the lines between the multiplicand selector switches 53a(1–12) in Fig. 2b and the dividers 61a(1–12) in Fig. 2c are selectively energized to represent the multiplicand 10111 and the lines between the multiplier selector switches 56b(1–8) in Fig. 2b and the dividers 192b(1–8) in Fig. 2d are selectively energized to represent the multiplier 1101. As the multiplier switches 56b(1, 3 and 4) and the multiplicand switches 53a(1, 2, 3 and 5) are closed, the corresponding indicator lights 58b(1, 3 and 4) and 55a(1, 2, 3 and 5), respectively, are illuminated to give a visual indication of the multiplier and the multiplicand.

As the lines to the dividers 61a(1–12) in Fig. 2c from the multiplicand sensing brushes 27a(1–12) in Fig. 2a or the multiplicand selector switches 53a(1–12) in Fig. 2b, as the case may be, are selectively energized to represent the multiplicand, the leads 64a(1–12) between the dividers 61a(1–12) and the multiplicand translator in Figs. 2c, 2e and 2f, are placed at appropriate voltage levels to represent the multiplicand. Thus, leads 64a(1, 2, 3 and 5) are placed at the higher of their two voltage levels while leads 64a(4 and 6–12) remain at their lower voltage levels.

The synchronizer for the translator as shown in Fig. 2g is supplying a starting impulse once each sixteen microseconds to the control grid of the pentode 82 in the first stage 65 of the commutator in Fig. 2f. The synchronizer is also supplying a synchronizing impulse and a clamping impulse once each microsecond to the synchronous impulse line S1 and the clamping impulse line K1, respectively, in the commutator.

As previously explained, the sixteen commutator stages 65–80 then deliver output impulses in succession at the rate of one microsecond per stage so that each commutator stage delivers an output impulse once each sixteen microseconds. This output impulse appears at the cathode of the triode 83 in each commutator stage and forms the input of a corresponding switching circuit 81a(1–12).

Each switching circuit 81a(1–12) either permits the output impulse of the corresponding commutator stage to pass to the multiplicand bus M1, or prevents it from so passing, depending upon whether the corresponding one of leads 64a(1–12) is at its higher or its lower voltage level, respectively. Since in the problem being considered, the lead wires 64a(1, 2, 3 and 5) only, are at their higher voltage levels, switching circuits 81a(1, 2, 3 and 5) only, permit the output impulses of the corresponding commutator stages to pass to the multiplicand bus M1. Thus, the multiplicand bus M1 has appearing thereon a series of positive voltage impulses representing the multiplicand 10111 and occurring at the first, second, third and fifth microseconds after the starting impulse. Another series of impulses representing the multiplicand appears in the same relative time position following the next starting impulse and is repeated after every starting impulse so long as the sensing brushes 27a(1–12) or the selector switches 53a(1–12), as the case may be, indicate such a multiplicand.

As the lines to the divider 192b(1-8), in Fig. 2d, from the multiplier sensing brushes 28b(1-8) in Fig. 2a or the multiplier selector switches 56b(1-8) in Fig. 2b, as the case may be, are selectively energized to represent the multiplier 1101, the lead wires 195b(1-8) in Figs. 2d, 2f, 2h and 2j, are placed at appropriate voltage levels to represent the multiplier. Thus, lead wires 195b(1, 3 and 4) are at the higher of their two voltage levels while the other lead wires are at their lower voltage levels. The voltage levels of thees lead wires, it is to be remembered, determine whether or not the corresponding one of the coincidence circuits 190b(1-8) in Figs. 2h and 2j permits passage therethrough of the time coded multiplicand impulses from the multiplicand translator. Only those coincidence circuits associated with those lead wires which are at their higher voltage levels pass the time coded multiplicand impulses.

Before considering the actual multiplication operation in connection with this sample problem, it may be well to review the usual manner of multiplying manually. Such multiplication is illustrated in Fig. 6. It may be seen that the multiplicand is written on the top line and the multiplier is written directly below the multiplicand. A line is drawn below the multiplier. All of the digits of the multiplicand are then multiplied by the first or right end digit of the multiplier to provide a first partial product which is written directly below the line. All of the digits of the multiplicand are then multiplied by the second digit of the multiplier and the second partial product provided thereby is written under the first partial product, but shifted one column to the left. Thus, the first digit of the second partial product is in the same vertical column as the second digit of the first partial product. The third partial product provided by the multiplication of all of the digits of the multiplicand by the third digit of the multiplier is written under the second partial product but shifted in position to the left by one column with respect to the second partial product, or two columns with respect to the first partial product. The fourth partial product provided by the multiplication of all of the digits of the multiplicand and the fourth digit of the multiplier is written under the third partial product, but shifted in position to the left by one column with respect to the third partial product, or two columns with respect to the second partial product or three columns with respect to the first partial product. To complete the multiplication, the partial products are added together column-by-column with regard to their columnar positions. This sum is then the total product of the multiplicand and the multiplier.

The multiplying device hereinbefore described, effects multiplication of the multiplicand and multiplier in a manner which in many respects is similar to that illustrated in Fig. 6. The actual multiplying operations may be better understood by a consideration of the diagram of Fig. 7. The time coded impulses representing the multiplicand are supplied from the multiplicand translator to the coaxial line 111. These pulses, as previously explained, occur at the first, second, third and fifth microseconds to represent the binary number 101111, as indicated just above the line 111. Throughout the diagram of Fig. 7, time coded impulses appearing at various points are represented at those points by a miniature wave drawn on a microsecond time base, the time in microseconds being indicated by appropriate numbers under the wave. The corresponding binary number is shown in parentheses directly above the wave. The wave shape for the impulses is idealized and is only illustrative and is not to be taken as the actual wave shape generated in this device.

The coded impulses representing the multiplicand on line 111 are delivered to the synchronous time delay circuit immediately preceding the coincidence circuits. This delay circuit incorporates tubes 196, 203 and 204 as shown in Fig. 2h. Returning to Fig. 7, it is seen that the time delay circuit delays each of the impulses making up the series which represents the multiplicand by exactly one microsecond. Therefore, in determining the corresponding binary number, an impulse at the second microsecond represents the first or right end digit in the binary number. The impulses from the delay circuit are applied through lead wires 213 to all of the coincidence circuits 190b(1-8) simultaneously.

The coincidence circuits 190b(1-8) are illustrated diagrammatically in Fig. 7 as switches controlled by the lead wires 195b(1-8). For the multiplier 1101, the lead wires 195b(1, 3 and 4) are at their higher voltages so that the corresponding coincidence circuits 190b(1, 3 and 4) may be considered as closed switches while the other coincidence circuits 190b(2 and 5-8) may be considered as open switches. Those coincidence circuits considered as closed switches represent binary 1's while those considered as open switches represent binary 0's in the multiplier.

It then becomes apparent that when the multiplicand impulses on line 213 are applied to the coincidence circuits 190b(1-8) they are, in effect, passed through those coincidence circuits corresponding to binary 1's and are not passed by those coincidence circuits corresponding to binary 0's. By applying all of the multiplicand impulses to each coincidence circuit, a simultaneous multiplication of all of the digits of the multiplicand by each digit of the multiplier individually is produced. The several partial products thus provided appear individually at the corresponding ones of the output lines 221ab(1-8) of the coincidence circuits. Thus, the first partial product provided by the multiplication of all of the digits of the multiplicand by the first digit of the multiplier appears on line 221ab1 and the second, third and fourth partial products appear on lines 221ab2, 221ab3 and 221ab4, respectively.

It is to be noted that an adding box is interposed between each two successive lines 221ab(1-8) upon which a partial product may appear. Since an adding box, in addition to providing the sum of two numbers, also produces a one microsecond delay, it is evident that the result provided by an adding box is shifted in time position by one column. Consequently, each of the lines 221ab(1-8) may be considered as representing a different columnar position.

The partial products appearing on lines 221ab(1-8) are added together with respect to their columnar position by the chain of adding boxes AB(1-6). The fourth partial product consisting of impulses at the second, third, fourth and sixth microseconds is fed into adding box AB4. Since, in the sample problem being considered, there are no other partial products provided through adding boxes AB(5-8), the fourth partial product appears in time coded form at the output of adding box AB4, but delayed one microsecond. The delayed fourth partial product consisting of impulses at the third, fourth, fifth and seventh microseconds, which has been column shifted to the left by one column because of the one microsecond delay introduced by adding box AB4, and the third partial product consisting of impulses at the second, third, fourth and fifth microseconds, are then added by the third adding box AB3.

When the third partial product and the column shifted fourth partial product are added in adding box AB3, the impulse occurring at the second microsecond in the third partial product enters the adding box AB3 by itself and emerges after a delay of one microsecond as an impulse at the third microsecond as indicated in Fig. 7. The third microsecond impulse in the third partial product enters the adding box AB3 simultaneously with the third microsecond impulse of the fourth partial product. These two are added together and produce a binary 0 represented by the absence of an impulse at the fourth microsecond in the output of adding box AB3 and a carry impulse at the fourth microsecond. When this carry impulse at the fourth microsecond enters the adding box AB3 simultaneously with both the fourth microsecond impulse in the third partial product and the fourth microsecond impulse in the fourth partial product, the three impulses produce an output impulse at the fifth microsecond as well as a carry impulse at the fifth microsecond. There is no impulse at the fifth microsecond in the third partial product so the carry impulse at the fifth microsecond enters the adding box simultaneously with the fifth microsecond impulse in the fourth partial product. The addition of these two impulses does not produce an output impulse at the sixth microsecond, but produces a carry impulse at the sixth microsecond. The sixth microsecond impulse in the third partial product enters the adding box simultaneously with the sixth microsecond carry impulse (there is no sixth microsecond impulse in the fourth partial product) and again a carry impulse is produced at the seventh microsecond but there is no output impulse. The seventh microsecond impulse in the fourth partial product coincides with the seventh microsecond carry impulse and, in passing through the adding box, they produce a carry impulse at the eighth microsecond, but do not produce an output impulse. There are no more impulses in the third and fourth partial products so that the eighth microsecond carry impulse enters the adding box alone and produces an output impulse at the ninth microsecond.

The output impulses from the adding box AB3 at the third, fifth and ninth microseconds represent the sum of the third and fourth partial products as shifted one more column to the left with respect to the second partial product because of the one microsecond relay afforded by adding box AB3 as indicated in Fig. 7. The second partial product, as indicated, is 00000 and is added to the sum of the third and fourth partial products by adding box AB2. The resulting sum of the second, third and fourth partial products is delayed an additional one microsecond to provide a further column shift of one column with respect to the first partial product and consists of impulses at the fourth, sixth and tenth microseconds.

The first partial product consisting of impulses at the second, third, fourth and sixth microseconds is then added to the sum of the second, third and fourth partial products by adding box AB1. The second and third microsecond impulses in the first partial product enter the adding box AB1 alone and so provide output impulses at the third and fourth microseconds, respectively. The fourth microsecond impulse in the first partial product enters the adding box simultaneously with the fourth microsecond impulse of the sum of the second, third and fourth partial products, and they produce a carry impulse at the fifth microsecond, but do not produce an output impulse. This carry impulse enters the adding box alone and produces an output impulse at the sixth microsecond. The sixth microsecond impulse of both the first partial product and the sum of the second, third and fourth partial products enter the adding box together and produce a carry impulse at the seventh microsecond, but do not produce an output impulse. This carry impulse enters the adding box alone and produces an output impulse at the eighth microsecond. No impulses are fed to the adding box during the eighth and ninth microseconds and the tenth microsecond impulse in the sum of the second, third and fourth partial products enters the adding box alone to provide an output impulse at the eleventh microsecond. Thus, the result consists of impulses at the third, fourth, sixth, eighth and eleventh microseconds.

It must be remembered that the adding box AB1 has provided a one microsecond time delay which was not necessary as a column shift. Therefore, in interpreting the time coded impulses at the output of adding box AB1, the third microsecond corresponds to the first digit in the corresponding binary number. As indicated in Fig. 7, this corresponding number is 100101011 which is identical with the binary number which is the product of the multiplicand and the multiplier in Fig. 6.

While the operation of the chain of adding boxes has been described as providing, with due regard to proper columnar positions, the addition of the highest order partial product (the fourth partial product in the sample problem) to the next to the highest order partial product (the third partial product in the problem), and the addition of this sum to the second from the highest order partial product, and the addition of this latter sum to the third from the highest order partial product, and so on through the lowest order partial product, it is to be understood that these steps are not isolated chronologically. In the sample problem, the entire group of impulses representing the fourth partial product is not passed through the fourth adding box AB4 before the operation of addition to the third partial product is begun in the third adding box AB3; nor is the complete sum of the third and fourth partial products obtained before its addition to the second partial product is begun in the second adding box AB2; and similarly, the complete sum of the second, third and fourth partial products is not obtained before its addition to the first partial product in the first adding box AB1 is begun. Instead, it can be seen from Fig. 7 that addition takes places in all of the adding boxes simultaneously on a digital scale. This is brought out even more clearly in the table below listing the entries at the inputs of the various adding boxes at different time periods in the sample problem, as well as the output and carry impulses and the digits of the final product. The symbols used in the table have the following meanings: D—digit, PP—Partial product, (1)—binary 1, (0)—binary 0.

| Time Period | Adding Box | Entry | | | Resulting Output | Carry to be Entered in Next Time Period | Product |
|---|---|---|---|---|---|---|---|
| | | From Partial Product | From Preceding Time Period Carry of Same Adding Box | From Output For Preceding Time Period of Next Higher Numbered Adding Box | | | |
| 1 | AB4 AB3 AB2 AB1 | | | | | | |
| 2 | AB4 AB3 AB2 AB1 | (1) 1st D, 4th PP (1) 1st D, 3rd PP (0) 1st D, 2nd PP (1) 1st D, 1st PP | | | (1) (1) (0) (1) | | } (1) 1st D. |
| 3 | AB4 AB3 AB2 AB1 | (1) 2nd D, 4th PP (1) 2nd D, 3rd PP (0) 2nd D, 2nd PP (1) 2nd D, 1st PP | | (1) (1) (0) | (1) (1) (0) (1) | (1) | } (1) 2nd D. |
| 4 | AB4 AB3 AB2 AB1 | (1) 3rd D, 4th PP (1) 3rd D, 3rd PP (0) 3rd D, 2nd PP (1) 3rd D, 1st PP | (1) | (1) (0) (1) | (1) (1) (0) (0) | (1) | } (0) 3rd D. |
| 5 | AB4 AB3 AB2 AB1 | (0) 4th D, 4th PP (0) 4th D, 3rd PP (0) 4th D, 2nd PP (0) 4th D, 1st PP | (1) (1) | (1) (1) (0) | (0) (0) (1) (1) | (1) | } (1) 4th D. |
| 6 | AB4 AB3 AB2 AB1 | (1) 5th D, 4th PP (1) 5th D, 3rd PP (0) 5th D, 2nd PP (1) 5th D, 1st PP | (1) | (0) (0) (1) | (1) (0) (0) (0) | (1) | } (1) 5th D. |
| 7 | AB4 AB3 AB2 AB1 | | (1) (1) | (1) (0) (0) | (0) (0) (0) (1) | (1) | } (1) 6th D. |
| 8 | AB4 AB3 AB2 AB1 | | (1) | | (0) (0) (1) (0) | (1) | } (0) 7th D. |
| 9 | AB4 AB3 AB2 AB1 | | | (1) (0) | (1) (0) (0) | | } (0) 8th D. |
| 10 | AB4 AB3 AB2 AB1 | | | (1) (0) | (1) (0) | | } (1) 9th D. |
| 11 | AB4 AB3 AB2 AB1 | | | (1) | (1) | | |

The first time period in the table, representing the first microsecond period after the starting impulse, has no corresponding entry or output as the first digit in any and all of the partial products is represented by an impulse in the second time period.

From an examination of the foregoing table, it is seen that digits of the same order of all of the partial products are entered simultaneously in their respective adding boxes. With each digit from a given partial product entered into its corresponding adding box, there is entered at the same time in that adding box any digit representing a carry from a preceding operation of the adding box and the sum of the digit of the next less order of the next higher partial product and the digit of the second less order of the second higher partial product and the digit of the third less order of the third higher partial product and so on through the first digit of a higher partial product. The above sum to which the digit is added is obtained from the previous adding boxes, i. e., higher numbered adding boxes, in the chain. Therefore, it may be said that if a digit is represented by a designation of the time period in which its impulse representation is found in its partial product (i. e., the time period corresponding in number to the digital position in the partial product occupied by the digit and not the time period relative to the starting impulse as listed in th foregoing table) with a subscript indicating the particular partial product in which the digit appears, then at any adding box AB$x$ corresponding to the Xth partial product at any time period $t$, there is entered from that partial product the digit $t$, and the following sum S is determined by that adding box:

$$S = t_x + [(t-1)_{x+1} + (t-2)_{x+2} + (t-3)_{x+3} \ldots + (t-n)_{x+n}] + \text{carry}$$

where $n = t-1$. The bracketed term above is entered into the adding box AB$x$ from the preceding adding box AB$(x+1)$ in the chain.

The digital addition proceeds in this fashion through adding box AB1, the output of which represents the product of the multiplicand and multiplier and is fed over line 280 of the time delay, pulse inverting circuit incorporating tubes 328 and 334 as shown in Figs. 2h and 7. This circuit produces a further delay of one microsecond in the group of impulses representing the product.

The time coded impulses representing the product as delivered by the time delay circuit incorporating tubes 328 and 334 in Fig. 2h are impressed on the product bus P in the product translator shown in Figs. 2e and 2f. These product impulses are fed to each of the sixteen stages of the product translator. The output impulses of each of the sixteen commutator stages 65–80 are also fed to the corresponding product translator stages. As mentioned heretofore, the product translator stages do not correspond in digital representation with the commutator stages, but are shifted by three, that is the fourth commutator stage 68 corresponds to the product translator stage 327c1 for the first digit of the product. This shift is to take care of the three microsecond delay afforded by, first, the delay circuit preceding the coincidence circuits; second, the adding box AB1; and, third, the delay circuit preceding the product translator. Now when a product impulse coincides in time with a commutator impulse at any particular product translator stage, the pentode 351 of that stage becomes conductive.

In the event the punch recorder in Fig. 2a is to be employed to record the product, the switches 10c(1–6) in Fig. 2c are closed in their upper position. Then when a pentode 351 in a product translator stage in Figs. 2e and 2f becomes conductive as a result of a product impulse on the product bus P, the corresponding one of punch magnets 39c(1–16) in the punch recorder in Fig. 2a is energized. As a punch magnet is energized, the corresponding one of punches 38c in Fig. 4, is operated to perforate a card in a manner to represent that digit of the product.

If, on the other hand, the visual indicator of Fig. 2b is to be employed instead of the punch recorder, the switches 10c(1–16) in Fig. 2c are closed in their lower positions. With this arrangement, the corresponding product indicator light 59c(1–16) in Fig. 2b is illuminated upon a pentode 351 in a stage of the product translator in Figs. 2e and 2f becoming conductive. Thus, the product is represented by the illuminated indicator lights.

Conclusion

In the multiplying device described and shown in the drawings, a multiplication operation takes place in nineteen microseconds. As long as a representation of the multiplicand and multiplier is provided by the record reader or the manual selector, as the case may be, the multiplication operation is repeated once each sixteen microseconds. Since with the record reader or manual selector as described, the representation is given over a period permitting several repetitions of the multiplication operation, it is quite convenient to have an arrangement in which several repetitive multiplication operations are necessary to actuate a punch recorder as in this apparatus. However, it will be readily understood by those skilled in the art that the device may be satisfactorily and usefully employed in what may be termed a "one shot" operation. That is, the product is found and a suitable indication thereof given with just one multiplication operation. This may be accomplished without departing from the main principles of the apparatus described.

While in the description of the fundamental novel features of my invention as applied to a preferred embodiment and as illustrated in the drawings, reference has been made to tubes of specific types, it will be understood that other tubes of suitable characteristics may be employed instead. It will also be understood that various other omissions, substitutions and changes in the form and details of the device illustrated and in its operation may be made by those skilled in the art without departing from the spirit of the invention. It is the intention, therefore, to be limited only as indicated by the scope of the following claims.

What is claimed is:

1. A translating apparatus comprising a plurality of lead wires, each corresponding to a different digital position in a binary number and arranged to have one of two different voltages to represent the binary value of the corersponding digit in the binary number; a commutator having a plurality of stages, one corresponding to each lead wire, and providing a voltage impulse having a predetermined base voltage level from a terminal of each of the stages in succession at a predetermined time rate; a common output line for said stages; and individual switch means interposed between each stage terminal and the output line and connected to the corersponding lead wire and effective to transfer a voltage impulse from the stage to the output line only while the lead wire is at a particular one of said two voltages; whereby a series of time coded impulses representing said number appears on said output line.

2. A translating apparatus comprising a plurality of lead wires, each corresponding to a different digital position in a binary number and arranged to be at one of two different voltages to represent the binary value of the corresponding digit in the binary number; a commutator having a plurality of stages, one corresponding to each lead wire, and providing a voltage impulse, having a predetermined base level intermediate said two voltages, from a terminal of each of the stages in succession at a predetermined time rate; a common output line for said stages; and individual switch means interposed between each stage and the output line and comprising a condenser and a first rectifier connected in series in the order named from said terminal to the output line with the first rectifier offering its lower impedance to current flow toward the output line, a second rectifier connected in parallel with said condenser and offering its higher impedance to current flow from said terminal, and a resistor connecting the corresponding lead wire to the junction between said condenser and first rectifier, whereby a voltage impulse is transferred from the terminal to the output line only while the corresponding lead wire is at that one of said two voltages which is more positive than said base level.

3. A switching circuit for controlling the passage of voltage impulses having a predetermined base voltage level from an input line to an output line comprising a control line adapted to be at one of two voltages, the first being more positive and the second more negative than said predetermined level; a resistor connecting said control line to said output line; a condenser connecting said output line to said input line; and a rectifier connected in parallel with said condenser and arranged to offer its lower impedance to current flow toward the input line; whereby said impulses are passed at said level only while said control line is at said first voltage.

4. A switching circuit for controlling the passage of voltage impulses having a predetermined base voltage level from an input line to an output line comprising a control line adapted to be at one of two voltages, the first being more positive and the second more negative than said predetermined level; a resistor and a first rectifier connected in series in the order named from the control line to the output line with the rectifier offering its lower impedance to current flow toward the output line; said output line having a normal voltage level intermediate said first and second voltages; a condenser connecting the input line to the junction between said resistor and first rectifier; and a second rectifier connected in parallel with said condenser and offering its lower impedance to current flow toward the input line; whereby said impulses are passed only while said control line is at said first voltage.

5. A coincidence circuit comprising an output circuit; an electronic tube interposed in the output circuit and having an electrode controlling the conductivity of the tube according to the voltage level of the electrode; work means responsive to current variations in said output circuit; a first input line adapted to be normally at a first voltage level and to have voltage variations applied thereto; a condenser coupling the electrode to the first input line; a rectifier connected in parallel with the condenser to conduct current toward the first input line; a second input line adapted to be at either a second voltage level more positive than said first level or a third voltage level more negative than said first level; and a resistor connecting said second input line to said electrode.

6. A coincidence circuit for use with a positive and a negative voltage supply line comprising an electronic vacuum tube having an anode, a cathode and a control electrode for controlling the conductivity of the tube according to the voltage level of the electrode; circuit means connecting the anode to the positive supply line; impedance means connecting the cathode to the negative supply line; an output line connected to said cathode; a first input line adapted to be normally at a first voltage level and to have voltage variations applied thereto; a condenser coupling the electrode to the first input line; a rectifier connected in parallel with the condenser to conduct current toward the first input line; a second input line adapted to be at either a second voltage level more positive than said first level or a third voltage level more negative than said first level; and a resistor connecting said second input line to said electrode.

7. Apparatus for multiplying a first number having a plurality of digits by a second number having but a single digit, comprising, a first supply line adapted to be normally at a first voltage level and to have applied thereto a series of time coded voltage impulses representing the first number; a second supply line adapted to be at either a second voltage level more negative than the first level or a third voltage level more positive than the first level according to whether the second number is a binary 0 or a binary 1, respectively; an electronic tube having an output circuit and having an electrode controlling the conductivity of the tube in accordance with the voltage level of the electrode; work means operable only in response to impulses in the output circuit above a predetermined level; impedance means connecting the control electrode to the second supply line; a coupling condenser connecting the electrode to the first supply line; and a rectifier connected in parallel with said coupling condenser to conduct current from the electrode toward the first supply line; the first, second and third levels permitting load circuit impulses above the predetermined level in response to first supply line coded impulses only when the second supply line is at the third level.

8. Apparatus for multiplying two numbers in the binary system comprising a plurality of coincidence electronic tubes corresponding to the different digital positions in the first number with each tube having an output circuit and an electrode controlling the conductivity of the tube in accordance with the voltage level of the electrode; a first supply line adapted to be normally at a first voltage level and to have applied thereto a series of time coded voltage impulses representing the first number; a condenser coupling the electrode of each tube to the first supply line; a rectifier connected in parallel with each condenser to conduct current toward the first supply line; an individual second supply line for each tube connected through impedance means to the electrode thereof and adapted to be at either a second voltage level more positive than said first level or a third voltage level more negative than said first level according to wether the digit in the corresponding digital position in the first number is a binary 0 or a binary 1, whereby each said electrode is effective in response to coded impulses on the first supply line only while the second supply line is at the third level to cause the corresponding tube to provide similarly timed operating impulses in its output circuit; and adding means connected to all said output circuits to add the numbers represented by the operating impulses of all the output circuits together in a predetermined time relation to produce a series of time coded impulses representing the product.

9. Apparatus for multiplying two numbrs in the binary system comprising a plurality of feed lines corresponding to the different digital positions in the first number; a supply line arranged to have thereon a series of time coded voltage impulses representing the second number with representations of individual digits occurring in succession; plural means each connected directly to said supply line and respectively to one of said feed lines, each said means having an output line and being adjustable according to whether the digit in the corresponding digital position in the first number is a binary 1 or a binary 0, to provide operating impulses having the same timing as those on said supply line, on those output lines corresponding to a binary 1, whereby there is on each of said output lines corresponding to the first through the last digital positions of the first number, successive representations of successive digits of a partial product equal to the product of all of the digits of the second number and the corresponding digit of the first number; and individual adding means connected to each of said output lines and receiving the representations of the same order digit of all of the partial products simultaneously, said adding means being effective upon receiving a digit $t_x$ of any order $t$ of any partial product $x$, to add that digit to the first order digit of the sum represented by $$[(t-1)_{x+1} + (t-2)_{x+2} + (t-3)_{x+3} \ldots + (t-n)_{x+n}] + C$$

where C is a carry digit resulting from such addition with respect to the next lower order digit of the same partial product and $n$ is equal to $t-1$, whereby such additions finally produced with respect to the digits of the first partial product provide a series of time coded impulses representing the product.

10. Apparatus for multiplying two numbers in the binary system comprising a plurality of feed lines corresponding to the different digital positions in the first number; a supply line adapted to have thereon a series of voltage impulses coded with reference to equally spaced index points in time to represent the second number with successive index points corresponding to successive increasing orders; plural means each connected directly to said supply line and respectively to one of said feed lines, each said means having an output line and being adjustable according to whether the digit in the corresponding digital position in the first number is a binary 1 or a binary 0, to provide operating impulses having the same timing as those on said supply line, on those output lines corresponding to a binary 1 and a plurality of adding circuits, one for each output line, connected in a series chain in the order of increasing digital positions represented by said output lines with an input terminal of each adding circuit connected to an output terminal of the succeeding adding circuit and another input terminal connected to the corresponding output line, each adding circuit being effective to add two numbers supplied as coded impulses to the two input terminals and provide their sum at the output terminal in coded impulse form delayed by one index point, whereby coded impulses appear at the output of the first adding circuit representing the product of said two numbers delayed by one index point.

11. Apparatus for multiplying two numbers in the binary system comprising a plurality of coincidence circuits corresponding to the different digital positions in the first number; means connected to said coincidence circuits for applying thereto simultaneously a series of voltage impulses coded with reference to equally spaced index points in time to represent the second number with successive index points corresponding to successive increasing orders; means connected directly to each coincidence circuit individually to apply thereto a voltage of one of two levels determined according to the value of the digit in the corresponding digital position in the first number; each coincidence circuit having an output line and being effective only upon simultaneous application thereto of a voltage of a predetermined one of said levels and the series of coded impulses to provide similarly timed operating impulses on the corresponding output line; and a plurality of adding circuits, one for each coincidence circuit, connected in a series chain in the order of increasing digital positions represented by their corresponding coincidence circuits with an input terminal of each adding circuit connected to an output terminal of the succeeding adding circuit and another input terminal connected to the output line of the corresponding coincidence circuit, each adding circuit being effective to add two numbers supplied as coded impulses to the two input terminals and provide their sum at the output terminal in coded impulse form delayed by one index point, whereby coded impulses appear at the output of the first adding circuit representing the product of said two numbers delayed by one index point.

12. Apparatus for multiplying two numbers in the binary system comprising a plurality of feed lines corresponding to the different digital positions in the first number; a supply line adapted to have thereon a series of voltage impulses coded with reference to equally spaced index points in time to represent the second number with successive index points corresponding to successive increasing orders; plural means each connected directly to said supply line and respectively to one of said feed lines, each said means having an output line and being adjustable according to whether the digit in the corresponding digital position in the first number is a binary 1 or a binary 0, to provide operating impulses having the same timing as those on said supply line, on those output lines corresponding to a binary 1, whereby there is represented on each of said output lines corresponding to the first through the last digital positions of the first number, a partial product equal to the product of all of the digits of the second number and the corresponding digit of the first number; and individual adding means connected to each of said output lines effective to delay the last partial product one index point and add it in the binary system to the next to last partial product providing the sum in coded impulse form delayed one more index point, and to add each of the remaining partial products to the delayed sum of the immediately succeeding partial product and all other succeeding partial products and provide the result in coded impulse form delayed one more index point, whereby there is provided coded impulses representing the product of said two numbers delayed by one index point.

13. Apparatus for multiplying two numbers in the binary system comprising two groups of a plurality of supply lines corresponding to the two numbers, with the supply lines of each group corresponding to different digital positions of the corresponding number and being adapted to be selectively energized to represent the corresponding digits; a first translator connected to the first group for deriving a series of time coded voltage impulses representing the first number; a plurality of circuit means corresponding to the different digital positions in the second number each connected directly to said first translator and individually connected to the corresponding one of the second group supply lines, each circuit means being adjustable according to the energization of the corresponding supply line to provide, when the corresponding second number digit is a binary 1, operating impulses having the same timing as the impulses from said first translator; adding means connected to all of said circuit means to add the numbers represented by said operating impulses thereof together in a predetermined time relation to produce a series of time coded impulses representing the product; a plurality of output lines corresponding to different digital positions in the product; and a second translator connected to said adding means for selectively energizing said output lines according to the impulses from said adding means to represent the product.

14. Apparatus for multiplying first and second numbers in the binary system comprising two groups of a plurality of supply lines corresponding to said two numbers, with the supply lines of each group corresponding to different digital positions of the corresponding number and being adapted to be selectively energized to represent the corresponding digits; a first translator connected to the first group for deriving a series of voltage impulses coded with reference to spaced index points in time to represent said first number; a plurality of circuit means corresponding to the different digital positions in said second number each connected directly to said first translator and individually connected to the corresponding one of the second group supply lines and adjustable according to the energization of the corresponding supply line to provide, when the corresponding second number digit is a binary 1, output operating impulses having the same timing as said first impulses from the translator; a plurality of adding circuits, one for each said circuit means, connected in a series chain in the order of increasing digital positions represented by the corresponding circuit means with an input terminal of each adding circuit connected to an output terminal of the succeeding adding circuit and another input terminal connected to the corresponding circuit means, each adding circuit being effective to add two numbers supplied as coded impulses to the two input terminals and provide their sum at the output terminal in coded impulse form delayed by one index point, whereby coded impulses appear at the output of the first adding circuit representing the product of said first and second numbers delayed by one index point; a plurality of output lines corresponding to different digital positions in the product; and a second translator connected to the output terminal of the first adding circuit for selectively energizing said output lines to represent the product.

15. Apparatus for multiplying two numbers in the binary system comprising two groups of a plurality of supply lines corresponding to the two numbers, with the supply lines of each group corresponding to different digital positions of the corresponding number and being adapted to be selectively energized to represent the corresponding digits; a commutator having a plurality of stages corresponding to the different digital positions in the first number and arranged to produce an output voltage impulse at each of the stages in succession at predetermined times; a common line for said stages; switch means interposed between each stage and said common line and connected to the corresponding first number supply line, each said switch means being effective to pass an impulse from the corresponding stage to the common line only when the corresponding supply line has a representation thereon of a predetermined one of the binary numerals, whereby a series of timed coded voltage impulses representing the first number are provided on said common line; a plurality of circuit means corresponding to the different digital positions in the second number connected to said common line and individually connected to the corresponding one of the second number supply lines, each said circuit means being adjustable according to the energization of the corresponding supply line to provide, when the corresponding digit is a binary 1, operating impulses having the same timing as the impulses on said common line; adding means connected to all of said circuit means to add the numbers represented by said operating impulses thereof together in a predetermined time relation to produce a series of time coded impulses representing the product; a plurality of output lines corresponding to different digital positions in the product; and a translator connected to said adding means for selectively energizing said output lines according to the impulses from the adding means to represent the product.

16. Apparatus for multiplying two numbers in the binary system comprising two groups of a plurality of supply lines corresponding to the two numbers, with the supply lines of each group corresponding to different digital positions of the corresponding number and being adapted to be selectively energized to represent the corresponding digits; a first translator connected to the first group for deriving a series of time coded voltage impulses representing the first number; a plurality of circuit means corresponding to the different digital positions in the second number each connected directly to said first translator and individually connected to the corresponding one of the second group supply lines, each circuit means being adjustable according to the energization of the corresponding supply line to provide, when the corresponding second number digit is a binary 1, operating impulses having the same timing as the impulses from said first translator; adding means connected to all of said circuit means to add the numbers represented by said operating impulses thereof together in a predetermined time relation to produce a series of time coded impulses representing the product; a plurality of output lines corresponding to different digital positions in the product; and a second translator having a plurality of stages corresponding to the different digital positions of the product, each stage comprising a coincidence circuit arrangement coupled to the adding means and to a different commutator stage determined according to the time code of the product and effective upon simultaneous application of a commutator impulse and a representation of said predetermined one of the binary numerals in the product impulses to selectively energize said output lines to represent the product.

17. Apparatus for multiplying two numbers in the binary system comprising two groups of a plurality of supply lines corresponding to the two numbers, with the supply lines of each group corresponding to different digital positions of the corresponding number and being adapted to be selectively energized to represent the corresponding digits; a translator connected to the first group for deriving a series of timed coded voltage impulses representing the first number; a plurality of circuit means corresponding to the different digital positions in the second number each connected directly to said translator and individually connected to the corresponding one of the second group supply lines, each circuit means being adjustable according to the energization of the corresponding supply line to provide, when the corresponding second number digit is a binary 1, operating impulses having the same timing as the impulses from said translator; and adding means connected to all of said circuit means to add the numbers represented by said operating impulses thereof together in a predetermined time relation to produce a series of time coded impulses representing the product.

18. A system for obtaining the product of two numbers each of which is represented in the binary scale of notation by a signal comprising a series of sequentially occurring electrical pulses spaced by a given time period, comprising: a sequence of gate circuits arranged to be conditioned respectively by the digit pulses of one of said numbers, means for feeding the signal representing the other of said numbers simultaneously to all of said gate circuits in parallel to provide a plurality of partial products, and means for combining said partial products including a plurality of delay circuits associated with said gate circuits to delay each of the pulses of a partial product by at least one said time period, whereby the sum of said partial products is produced in the form of a series of sequentially occurring electrical pulses representing said product.

19. A system for obtaining the product of two numbers each of which is represented in the binary scale of notation by a signal comprising a series of sequentially occurring electrical pulses spaced by a given time period, comprising: a sequence of gate circuits arranged to be conditioned respectively by the digit pulses of one of said numbers, means for feeding the signal representing the other of said numbers simultaneously to all of said gate circuits in parallel to provide a plurality of partial products, and means for combining said partial products including a plurality of delay circuits interposed between said gate circuits to delay each of the pulses of a partial product by at least one said time period, whereby the sum of said partial products is produced in the form of a series of sequentially occurring electrical pulses representing said product.

20. A system for obtaining the product of two numbers each of which is represented in the binary scale of notation by a signal comprising a series of sequentially occurring electrical pulses spaced by a given time period, comprising: a sequence of gate circuits arranged to be conditioned respectively by the digit pulses of one of said numbers, means for feeding the signal representing the other of said numbers simultaneously to all of said gate circuits in parallel to provide a plurality of partial products, means for combining said partial products including a plurality of delay circuits associated with said gate circuits to delay each of the pulses of a partial product by at least one said time period, and means for supplying a train of regularly recurring pulses separated from each other by one said time period to said delay circuits to control the delay period thereof, whereby the sum of said partial products is produced in the form of a series of sequentially occurring electrical pulses representing said product.

BYRON L. HAVENS.

References Cited in the file of this patent

UNITED STATES PATENTS

| Number | Name | Date |
|---|---|---|
| 2,275,016 | Koch | Mar. 3, 1942 |
| 2,398,771 | Compton | Apr. 23, 1946 |
| 2,404,047 | Flory et al. | July 16, 1946 |
| 2,405,237 | Ruhling | Aug. 6, 1946 |
| 2,406,350 | Harrison | Aug. 27, 1946 |
| 2,425,131 | Snyder | Aug. 5, 1947 |
| 2,428,812 | Rajchman | Oct. 14, 1947 |
| 2,429,227 | Herbst | Oct. 21, 1947 |
| 2,429,228 | Herbst | Oct. 21, 1947 |
| 2,435,598 | Oliver | Feb. 10, 1948 |
| 2,445,215 | Flory | July 13, 1948 |
| 2,447,799 | Dickinson | Aug. 24, 1948 |
| 2,447,800 | Dickinson | Aug. 24, 1948 |
| 2,482,759 | Goodrich et al. | Sept. 27, 1949 |
| 2,489,813 | Poch | Nov. 29, 1949 |